(12) United States Patent
Akiyama

(10) Patent No.: US 6,240,053 B1
(45) Date of Patent: May 29, 2001

(54) OPTICAL PICKUP DEVICE

(75) Inventor: Hiroshi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/305,693

(22) Filed: May 5, 1999

(30) Foreign Application Priority Data

May 7, 1998 (JP) .................................................. 10-124932
Jun. 24, 1998 (JP) .................................................. 10-177568

(51) Int. Cl.$^7$ ................................................... G11B 7/095
(52) U.S. Cl. ................................... 369/44.23; 369/112.24
(58) Field of Search ............. 369/44.23, 112.16–112.17, 369/112.23–112.26

(56) References Cited

U.S. PATENT DOCUMENTS

| | | | |
|---|---|---|---|
| 5,231,620 | * 7/1993 | Ohuchida | 369/112 X |
| 5,488,599 | 1/1996 | Akiyama et al. | 369/112 |
| 5,572,323 | 11/1996 | Maeda et al. | 356/356 |
| 5,777,961 | * 7/1998 | Matsui | 369/44.23 |

FOREIGN PATENT DOCUMENTS

| | | |
|---|---|---|
| 4-34740 | 2/1992 | (JP) . |
| 06259804 | 9/1994 | (JP) . |
| 08055363 | 2/1996 | (JP) . |

OTHER PUBLICATIONS

M. Shinoda, et al., "Twin–Lens Optical Pickup for DVD", Optical Technology Contact, vol. 33, No. 11 (1995), p. 619–624.

* cited by examiner

Primary Examiner—W. R. Young
(74) Attorney, Agent, or Firm—Dickstein Shapiro Morin & Oshinsky LLP

(57) ABSTRACT

An optical pickup device includes first and second light sources which emit first and second light beams being different in wavelength, the different wavelengths being appropriate for first and second optical disks. The optical pickup device includes a coupling lens device which converts one of the first and second light beams into a collimated beam. The first light source is turned ON only when the first optical disk is accessed, and the second light source is turned ON only when the second optical disk is accessed. The coupling lens device is anamorphic and has a longitudinal magnification and a lateral magnification which are different, providing a collimation function and a cross-sectional profile correction function for each of the first and second light beams.

19 Claims, 10 Drawing Sheets

XZ PLANE

YZ PLANE

XZ PLANE

YZ PLANE

XZ PLANE

YZ PLANE

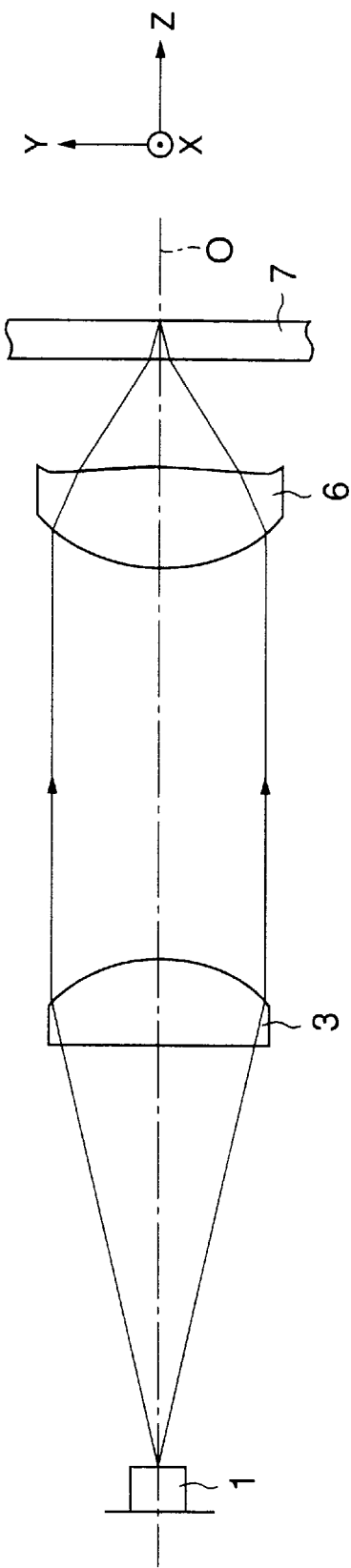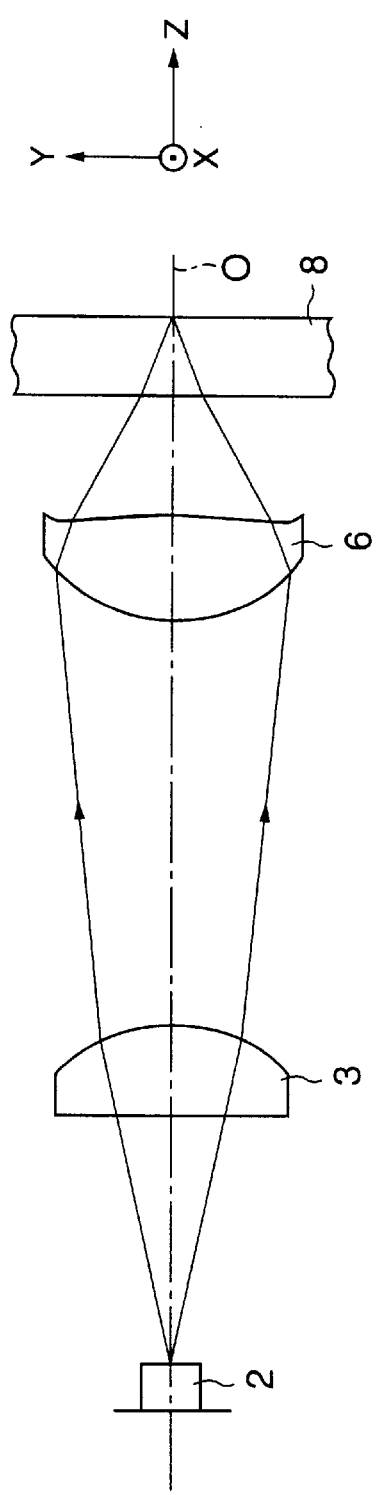

OPTICAL PICKUP DEVICE

BACKGROUND OF THE INVENTION (1) Field of the Invention

The present invention relates to an optical pickup device in which a tracking error and a focusing error are detected based on a reflection beam of a light spot on an optical disk in order to carry out recording, reproducing or erasing of information of the optical disk.

(2) Description of the Related Art

Generally, in an optical pickup device, a tracking error detection and a focusing error detection are carried out. The tracking error detection allows the emission beam to trail a track of the optical disk to the exact position when recording, reproducing or erasing information of the optical disk. The focusing error detection allows the light spot to be accurately focused on the optical disk when recording, reproducing or erasing information of the optical disk.

There is a demand for mass-storage optical disks which are rewritable. In order to keep up with this demand, two main types of optical disk drive currently exist: a write-once optical disk drive which accesses a CD-R (compact disk recordable), and a rewritable optical disk drive which accesses a DVD (digital video disk). The optical pickup device of the write-once optical disk drive reads data from the CD-R, and can write data to the CD-R once only. The optical pickup device of the rewritable optical disk drive reads data from the DVD, and can write or erase data to the DVD many times.

The CD-R (which will be called a second optical disk) has a transparent substrate which is about 1.2 mm thick, and the DVD (which will be called a first optical disk) has a transparent substrate which is about 0.6 mm thick. In a standard CD-R type pickup device, a laser diode which emits a laser beam having a wavelength of 785 nm is used as a light source (which will be called a second light source). In a standard DVD type pickup device, a laser diode which emits a laser beam having a wavelength of 650 nm is used as a light source (which will be called a first light source).

As disclosed in Japanese Laid-Open Patent Application No.6-259804, an optical pickup device which is designed to access information of the first optical disk and the second optical disk in a shared manner is known. In the optical pickup device of the above publication, the first light source and the second light source are used.

On the other hand, it is known that a laser beam emitted by a laser diode is divergent, and the diverging angle of the laser beam is the maximum in a direction perpendicular to the recording layer of the optical disk and it is the minimum in a direction parallel to the recording layer of the optical disk. Generally, a cross-sectional profile of the laser beam emitted by the laser diode has a far field pattern (FFP) which is elliptic.

In order to obtain good characteristics for reproducing, recording or erasing of information of an optical disk, it is desired that the light spot on the optical disk, formed by the emission laser beam, is circular in cross section. It is likely that the reproducing, recording or erasing characteristics of an optical pickup device will be lowered as the light spot on the optical disk is deviating from the circular cross section into an elliptic form. Hence, a beam profile correcting device which suitably eliminates such a deviation from the light spot on the optical disk, formed by the emission laser beam, is necessary in order to obtain a light spot in the circular cross section for each of the first and second optical disks.

However, the optical pickup device of the above publication does not take account of the possible deviation of a light spot on the optical disk in the circular cross section. Hence, the reproducing, recording or erasing characteristics of this optical pickup device are degraded in the case of the deviation of the light spot.

Japanese Laid-Open Patent Application No.4-34740 discloses an optical pickup device in which the above-mentioned beam profile correcting device is formed by a combination of prisms. The use of the prisms in the optical system of an optical pickup device causes the laser beam to be refracted in a certain manner. The design of optical paths of the elements in the optical pickup device will be complicated and restricted due to the refraction of the laser beam by the prisms. Hence, the beam profile correcting device as in the optical pickup device of the above publication is significantly inconvenient when creating the layout of an optical pickup device which has a simple structure and is inexpensive.

Japanese Laid-Open Patent Application No.8-55363 discloses an optical pickup device in which a single objective lens is provided for a first light source and a second light source in a shared manner. A condenser lens which is configured to suitably access the first optical disk (or the DVD) is provided. In the optical pickup device of the above publication, the object distance of the light beam entering the objective lens is selectively changed for accessing the first optical disk (or the DVD) and for accessing the second optical disk (or the CD). When the second optical disk (or the CD) is accessed by using the condenser lens and the objective lens, the laser beam entering the objective lens is divergent. The wave aberration of the objective lens when it is shifted in a radial direction of the second optical disk due to the tracking control, is considerably degraded. In such a case, the accessing characteristics of the optical pickup device for the second optical disk will be significantly lowered.

SUMMARY OF THE INVENTION

An object of the present invention is to provide an improved optical pickup device in which the above-described problems are eliminated.

Another object of the present invention is to provide an optical pickup device which provides good characteristics for reproducing, recording or erasing of information of each of optical disks of two types having substrates different in thickness, while requiring no specially-designed beam profile correcting device.

Still another object of the present invention is to provide an optical pickup device which provides good characteristics for reproducing, recording or erasing of information of each of optical disks of two types having substrates different in thickness by using a single objective lens and a coupling lens having a beam profile correction function.

The above-mentioned objects of the present invention are achieved by an optical pickup device which includes: first and second light sources which respectively emitting first and second light beams, the first and second light beams being different in wavelength, the different wavelengths being appropriate for first and second optical disks; a coupling lens device which converts one of the first and second light beams into a collimated beam, the coupling lens device providing the collimated beam with a circularly corrected profile in cross section; an objective lens device which provides a light spot on one of the first and second optical disks by focusing the collimated beam from the coupling lens device; a beam separator device which separates a reflection beam of the light spot, passed through the objective lens device, from an optical path along which a corresponding one of the first and second light beams is directed to one of the first and second optical disks; a photodetector device which receives the reflection beam from the beam separator device, and outputs a signal indicative of an intensity of the received reflection beam; and a control unit which outputs a focusing error signal and a tracking error signal based on the signal output by the photodetector device, so that a focusing control and a tracking control are carried out, wherein the first light source is turned ON only when the first optical disk is accessed, and the second light source is turned ON only when the second optical disk is accessed, and wherein the coupling lens device is anamorphic and has a longitudinal magnification and a lateral magnification which are different from each other, the coupling lens device providing a collimation function and a cross-sectional profile correction function for each of the first and second light beams.

The above-mentioned objects of the present invention are achieved by an optical pickup device which includes: first and second light sources which respectively emit first and second light beams, the first and second light beams being different in wavelength, the different wavelengths being appropriate for first and second optical disks; a coupling lens which converts at least one of the first and second light beams into a collimated beam, the coupling lens circularly correcting a cross-sectional profile of each of the first and second light beams; an objective lens which provides a light spot on one of the first and second optical disks by focusing the beam with the profile circularly corrected by the coupling lens; a beam separator device which separates a reflection beam of the light spot, passed through the objective lens, from an optical path of a corresponding one of the first and second light beams is directed to one of the first and second optical disks; and a photodetector device which receives the reflection beam from the beam separator device and outputs a signal indicative of an intensity of the received reflection beam, wherein the coupling lens is anamorphic and has a longitudinal magnification and a lateral magnification which are different from each other, the coupling lens providing a cross-sectional profile correction function for each of the first and second light beams, and wherein the objective lens is provided for the first light source and the second light source in a shared manner, and the objective lens is used with a first numerical aperture when the first optical disk is accessed and used with a second numerical aperture when the second optical disk is accessed.

In the optical pickup device of a preferred embodiment of the present invention, the coupling lens device is formed by an anamorphic lens having a longitudinal magnification and a lateral magnification which are different from each other, the coupling lens device providing a collimation function and a cross-sectional profile correction function for each of the first and second light beams. The optical pickup device of the preferred embodiment does not require a specially-designed beam profile correcting device. The optical pickup device of the present invention is effective in providing good characteristics for reproducing, recording or erasing of information of the first optical disk and the second optical disk in a shared manner. It is possible to provide the flexibility of the layout of an optical pickup device which has a simple structure and is inexpensive.

BRIEF DESCRIPTION OF THE DRAWINGS

Other objects, features and advantages of the present invention will become more apparent from the following detailed description when read in conjunction with the accompanying drawings in which:

FIG. 10A and FIG. 10B are diagrams for explaining an operation of a further embodiment of the optical pickup device of the present invention;

DETAILED DESCRIPTION OF THE PREFERRED EMBODIMENTS

A description will now be given of the preferred embodiments of the present invention with reference to the accompanying drawings.

Figure 1:
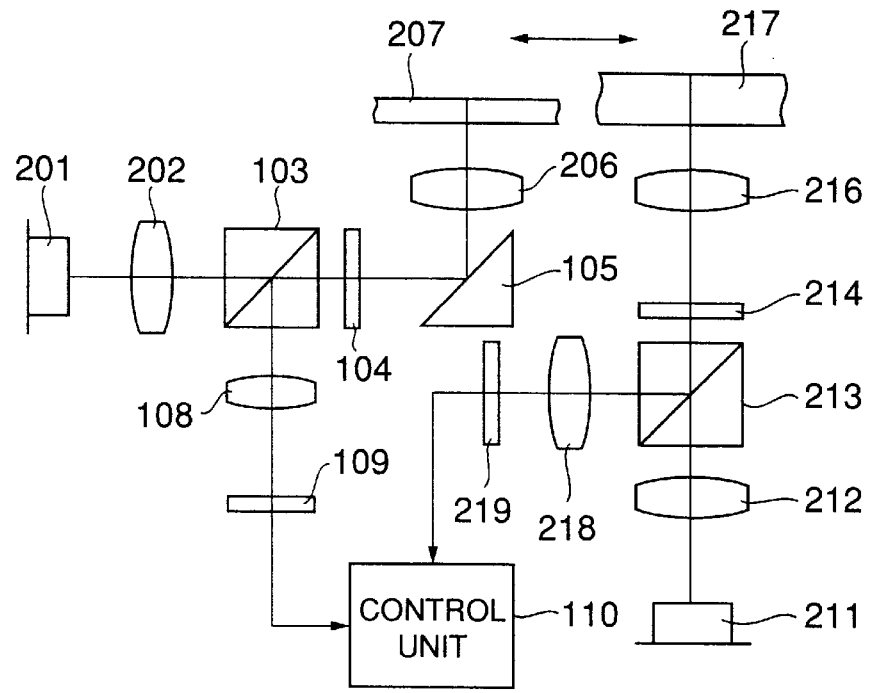
FIG. 1 is a diagram showing an embodiment of an optical pickup device of the present invention.

FIG. 1 shows an embodiment of an optical pickup device of the present invention. In FIG. 1, reference numeral 207 denotes a first optical disk (for example, the DVD), reference numeral 217 indicates a second optical disk (for example, the CD), reference numeral 201 denotes a first light source (for example, a laser diode), and reference numeral 211 indicates a second light source (for example, a laser diode). The first optical disk 207 has a transparent substrate which is about 0.6 mm thick. The second optical disk 217 has a transparent substrate which is about 1.2 mm thick. The optical pickup device of FIG. 1 is configured such that it includes two optical systems which are separately provided for the first optical disk 207 and the second optical disk 217.

In the optical pickup device of FIG. 1, the first light source 201 emits a first laser beam having a first wavelength of 635 nm appropriate for accessing the first optical disk 207. The second light source 211 emits a second laser beam having a second wavelength of 785 nm appropriate for accessing the second optical disk 217. The first light source 201 is turned ON only when the first optical disk 207 is accessed, and the second light source 211 is turned ON only when the second optical disk 217 is accessed.

A first coupling lens 202 converts the first laser beam of the first light source 201 into a collimated beam, the first coupling lens 202 providing the collimated beam with a circularly corrected profile in cross section. The corrected profile of the first laser beam is substantially circular in the cross section. A second coupling lens 212 converts the second laser beam of the second light source 211 into a collimated beam, the second coupling lens 212 providing the collimated beam with a circularly corrected profile in cross section. The corrected profile of the second laser beam is substantially circular in the cross section.

In the present embodiment, the first coupling lens 202 and the second coupling lens 212, which are identical to each other, form a coupling lens device which converts one of the first and second laser beams into a collimated beam, the coupling lens device providing the collimated beam with a circularly corrected profile in cross section. As described later, the coupling lens device is formed by an anamorphic lens having a longitudinal magnification and a lateral magnification which are different from each other, the coupling lens device providing a collimation function and a cross-sectional profile correction function for each of the first and second light beams.

In the optical pickup device of FIG. 1, the collimated beam from the first coupling lens 202 is passed through a polarization beam splitter 103, and the polarization beam splitter 103 converts the collimated beam into a linearly polarized beam passing through the beam splitter 103. A quarter-wave plate 104 converts the linearly polarized beam from the beam splitter 103 into a circularly polarized beam passing through the quarter-wave plate 104. A deflection prism 105 directs the circularly polarized beam from the quarter-wave plate 104 to an objective lens 206 by a 90-degree deflection. The beam from the objective lens 206 passes through the transparent substrate of the first optical disk 207. The objective lens 206 provides a light spot on a recording layer of the first optical disk 207 by focusing the collimated beam from the coupling lens 202.

A reflection beam of the light spot from the first optical disk 207 passes through the objective lens 206. The deflection prism 105 directs the reflection beam from the first optical disk 207 to the quarter-wave plate 104 by a 90-degree deflection. The quarter-wave plate 104 converts the reflection beam from the deflection prism 105 into a phase-shifted polarized beam. The polarization beam splitter 103 directs the reflection beam from the quarter-wave plate 104 to a cylindrical lens 108. The polarization beam splitter 103 acts as a beam separator which separates a reflection beam of the light spot, passed through the first objective lens 206, from the optical path along which the first laser beam is directed to the first optical disk 207. The cylindrical lens 108 focuses the lateral reflection beam from the polarization beam splitter 103 onto a first photodetector 109.

The first photodetector 109 receives the reflection beam from the polarization beam splitter 103, and outputs a signal indicative of an intensity of the received reflection beam to a control unit 110. The control unit 110 outputs a focusing error signal and a tracking error signal based on the signal output by the first photodetector 109, so that a focusing control and a tracking control are carried out. In the control unit 110, a focusing error signal is generated based on the output signal of the first photodetector 109 in accordance with a known astigmatism method, and a tracking error signal is generated based on the output signal of the first photodetector 109 in accordance with a known push-pull method. The objective lens 206 is provided with an actuator (not shown), and the actuator is driven in accordance with the focusing error signal and the tracking error signal output by the control unit 110, so as to move the objective lens 206 in the focusing direction and the tracking direction.

In the optical pickup device of FIG. 1, when recording, reproducing or erasing information of the second optical disk 217, the second light source 211 is turned ON to emit the second laser beam having the second wavelength appropriate for accessing the second optical disk 217. The second coupling lens 212, which is identical to the first coupling lens 202, converts the second laser beam of the second light source 211 into a collimated beam. The second coupling lens 212 provides the collimated beam with a circularly corrected profile in cross section. The corrected profile of the second laser beam is substantially circular in the cross section.

In the optical pickup device of FIG. 1, the collimated beam from the second coupling lens 212 is passed through a polarization beam splitter 213, and the polarization beam splitter 213 converts the collimated beam into a linearly polarized beam passing through the beam splitter 213. A quarter-wave plate 214 converts the linearly polarized beam from the beam splitter 213 into a circularly polarized beam passing through the quarter-wave plate 214. The circularly polarized beam from the quarter-wave plate 214 is directed to an objective lens 216. The beam from the objective lens 216 passes through the transparent substrate of the second optical disk 217. The objective lens 216 provides a light spot on a recording layer of the second optical disk 217 by focusing the collimated beam from the coupling lens 212.

A reflection beam of the light spot from the second optical disk 217 passes through the objective lens 216. The reflection beam from the objective lens 216 passes through the quarter-wave plate 214. The quarter-wave plate 214 converts the reflection beam into a phase-shifted polarized beam. The polarization beam splitter 213 directs the reflection beam from the quarter-wave plate 214 to a cylindrical lens 218. The polarization beam separator 213 acts as a beam separator which separates a reflection beam of the light spot, passed through the second objective lens 216, from the optical path along which the second laser beam is directed to the second optical disk 217. The cylindrical lens 218 focuses the lateral reflection beam from the polarization beam splitter 213 onto a second photodetector 219.

The second photodetector 219 receives the reflection beam from the polarization beam splitter 213, and outputs a signal indicative of an intensity of the received reflection beam to the control unit 110. The control unit 110 outputs a focusing error signal and a tracking error signal based on the signal output by the second photodetector 219, so that a focusing control and a tracking control are carried out. The objective lens 216 is provided with an actuator (not shown), and the actuator is driven in accordance with the focusing error signal and the tracking error signal output by the control unit 110, so as to move the objective lens 216 relative to the second optical disk 217 in the focusing direction and the tracking direction.

As described above, the optical pickup device of FIG. 1 is configured such that it includes a first optical system and a second optical system which are separately provided for the first optical disk 207 and the second optical disk 217. When the first optical disk 207 is accessed, the first optical system is set in an active condition and the second optical system is set in an inactive condition. When the second optical disk 217 is accessed, the second optical system is set in an active condition and the first optical system is set in an inactive condition. When the necessity arises due to the layout, the deflection prism 105 in the optical pickup device may be omitted, or another deflection prism may be provided between the quarter-wave plate 214 and the objective lens 216. In the above-described embodiment, the control unit 110 is provided for the first and second optical systems in common. Alternatively, a first control unit and a second control unit may be separately provided for the first optical system and the second optical system.

The optical pickup device of FIG. 1 is provided for recording, reproducing or erasing information of the first optical disk 207 and the second optical disk 217 in a shared manner. The optical pickup device of FIG. 1 includes the first and second light sources 201 and 211 which respectively emit the first and second light beams, the first and second light beams being different in wavelength, the different wavelengths being appropriate for the first and second optical disks 207 and 217. A coupling lens device, which is constituted by the coupling lenses 202 and 212, converts one of the first and second light beams into a collimated beam, the coupling lens device providing the collimated beam with a circularly corrected profile in cross section. An objective lens device, which is constituted by the objective lenses 206 and 216, provides a light spot on one of the first and second optical disks 207 and 217 by focusing the collimated beam from the coupling lens device. A beam separator device, which is constituted by the polarization beam splitters 103 and 213, separates a reflection beam of the light spot, passed through the objective lens device, from an optical path along which a corresponding one of the first and second light beams is directed to one of the first and second optical disks 207 and 217. A photodetector device, which is constituted by the first and second photodetectors 109 and 219, receives the reflection beam from the beam separator device, and outputs a signal indicative of an intensity of the received reflection beam. The control unit 110 outputs a focusing error signal and a tracking error signal based on the signal output by the photodetector device, so that a focusing control and a tracking control are carried out. In the optical pickup device of FIG. 1, the first light source 201 is turned ON only when the first optical disk 207 is accessed, and the second light source 211 is turned ON only when the second optical disk 217 is accessed. In the optical pickup device of FIG. 1, the coupling lens device (the coupling lens 202 or 212) is formed by an anamorphic lens having a longitudinal magnification and a lateral magnification which are different from each other, the coupling lens device providing a collimation function and a cross-sectional profile correction function for each of the first and second light beams.

In the optical pickup device of the above-described embodiment, the coupling lens device is formed by an anamorphic lens having a longitudinal magnification and a lateral magnification which are different from each other, the coupling lens device providing a collimation function and a cross-sectional profile correction function for each of the first and second light beams. The optical pickup device of the present embodiment does not require a specially-designed beam profile correcting device. The optical pickup device of the present embodiment is effective in providing good characteristics for reproducing, recording or erasing of information of the first optical disk and the second optical disk in a shared manner. It is possible to provide the flexibility of the layout of an optical pickup device which has a simple structure and is inexpensive.

Further, in the optical pickup device of FIG. 1, the coupling lens device includes the coupling lenses 202 and 212 which are identical, the objective lens device includes the objective lenses 206 and 216, the beam separator device includes the polarization beam splitters 103 and 213, and the photodetector device includes the photodetectors 109 and 219. The coupling lens 202, the objective lens 206, the beam splitter 103 and the photodetector 109 are combined together with respect to the first light source 201, so as to access the first optical disk 207. The coupling lens 212, the objective lens 216, the second beam separator 213 and the second photodetector 219 are combined together with respect to the second light source 211, so as to access the second optical disk 217. The coupling lens 202 and the coupling lens 212 are identical to each other.

Figure 2:
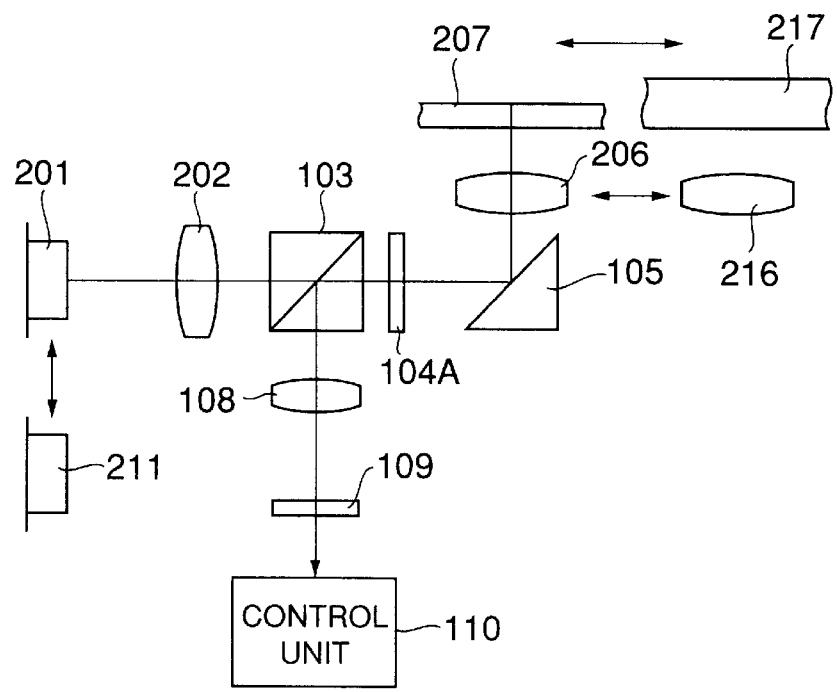
FIG. 2 is a diagram showing another embodiment of the optical pickup device of the present invention.

FIG. 2 shows another embodiment of the optical pickup device of the present invention.

In FIG. 2, the elements which are essentially the same as corresponding elements in FIG. 1 are designated by the same reference numerals, and a description thereof will be omitted.

The optical pickup device of FIG. 2 is configured such that the elements, other than the light sources 201 and 211 and the objective lenses 206 and 216, are constituted by common parts.

In the optical pickup device of the present embodiment, when recording, reproducing or erasing information of the first optical disk 207, the first light source 201, the coupling lens 202 and the objective lens 206 are set in the active condition as shown in FIG. 2. The first light source 201 emits the first laser beam having the first wavelength. The coupling lens 202 converts the first laser beam into a collimated beam, the first coupling lens 202 providing the collimated beam with a circularly corrected profile in cross section. The corrected profile of the first laser beam is substantially circular in the cross section. The polarization beam splitter 103 converts the collimated beam into a linearly polarized beam. A quarter-wave plate 104A, which is a common part provided for the first and second light sources 201 and 211, converts the linearly polarized beam into a circularly polarized beam. The deflection prism 105 directs the circularly polarized beam to the objective lens 206 by a 90-degree deflection. The beam from the objective lens 206 passes through the transparent substrate of the first optical disk 207. The objective lens 206 provides a light spot on the recording layer of the first optical disk 207 by focusing the collimated beam from the coupling lens 202.

A reflection beam of the light spot from the first optical disk 207 passes through the objective lens 206. The deflection prism 105 directs the reflection beam from the first optical disk 207 to the quarter-wave plate 104A by a 90-degree deflection. The quarter-wave plate 104A converts the reflection beam from the deflection prism 105 into a phase-shifted polarized beam. The polarization beam splitter 103 directs the reflection beam from the quarter-wave plate 104A to the cylindrical lens 108. The cylindrical lens 108 focuses the lateral reflection beam from the polarization beam splitter 103 onto the photodetector 109.

The photodetector 109 receives the reflection beam from the polarization beam splitter 103, and outputs a signal indicative of an intensity of the received reflection beam to the control unit 110. The control unit 110 outputs a focusing error signal and a tracking error signal based on the output signal of the photodetector 109, so that a focusing control and a tracking control are carried out. In the control unit 110, a focusing error signal is generated based on the output signal of the photodetector 109 in accordance with the astigmatism method, and a tracking error signal is generated based on the output signal of the photodetector 109 in accordance with the push-pull method. The objective lens 206 is provided with an actuator (not shown), and the actuator is driven in accordance with the focusing error signal and the tracking error signal output by the control unit 110, so as to move the objective lens 206 in the focusing direction and the tracking direction.

In the optical pickup device of FIG. 2, when recording, reproducing or erasing information of the second optical disk 217, the second light source 211 and the objective lens 216 are set in the active condition, instead of the first light source 201 and the objective lens 206, and the coupling lens 202 remains in the active condition.

"Twin-Lens Optical Pickup for DVD" by M. Shinoda et al., in Optical Technology Contact, Vol.33, No.11 (1995), pp.619–624, discloses an objective lens actuator which selectively actuates one of two objective lenses. An objective lens actuator of the type disclosed in the above publication may be used for changing one of the objective lenses 206 and 216 to the other in the present embodiment.

The second light source 211 is turned ON to emit the second laser beam having the second wavelength. The coupling lens 202 converts the second laser beam of the second light source 211 into a collimated beam. The coupling lens 202 provides the collimated beam with a circularly corrected profile in cross section. The corrected profile of the second laser beam is substantially circular in the cross section.

In the optical pickup device of FIG. 2, the collimated beam from the coupling lens 202 is passed through the polarization beam splitter 213. The polarization beam splitter 213 converts the collimated beam into a linearly polarized beam. The quarter-wave plate 214A converts the linearly polarized beam into a circularly polarized beam. The deflection prism 105 directs the circularly polarized beam to the objective lens 216 by a 90-degree deflection. The beam from the objective lens 216 passes through the transparent substrate of the second optical disk 217. The objective lens 216 provides a light spot on the recording layer of the second optical disk 217 by focusing the collimated beam from the coupling lens 202.

A reflection beam of the light spot from the second optical disk 217 passes through the objective lens 216. The deflection prism 105 directs the reflection beam from the first optical disk 207 to the quarter-wave plate 104A by a 90-degree deflection. The quarter-wave plate 104A converts the reflection beam into a phase-shifted polarized beam. The polarization beam splitter 103 directs the reflection beam from the quarter-wave plate 214A to the cylindrical lens 108. The cylindrical lens 108 focuses the lateral reflection beam from the polarization beam splitter 103 onto the photodetector 109.

The photodetector 109 receives the reflection beam from the polarization beam splitter 103, and outputs a signal indicative of an intensity of the received reflection beam to the control unit 110. The control unit 110 outputs a focusing error signal and a tracking error signal based on the output signal of the photodetector 109, so that a focusing control and a tracking control are carried out. The objective lens 216 is provided with an actuator (not shown), and the actuator is driven in accordance with the focusing error signal and the tracking error signal output by the control unit 110, so as to move the objective lens 216 relative to the second optical disk 217 in the focusing direction and the tracking direction.

In the optical pickup device of FIG. 2, the coupling lens device includes a single coupling lens 202 only, and the coupling lens 202 is provided for the first light source 201 and the second light source 211 in a shared manner.

When an adequately large quantity of laser light can be emitted by the light sources 201 and 211, the polarization beam splitter 103 or 213 in the embodiments of FIG. 1 and FIG. 2 may be replaced by a normal beam splitter. In such a modification, the quarter-wave plate 104, 214 or 104A in the embodiments of FIG. 1 and FIG. 2 may be omitted.

In the optical pickup device of FIG. 2, the quarter-wave plate 104A is provided for the first light source 201 and the second light source 211 in a shared manner. The quarter-wave plate 104A acts to convert each of the first and second laser beams having the first and second wavelengths into a polarized beam. The quarter-wave plate 104A of this type may be formed with thin films of double-refraction materials. Suppose that the double-refraction materials indicate differences "dn1" and "dn2" in the refractive index with respect to the first and second wavelengths "L1" and "L2" of the laser beams of the first and second light sources 201 and 211. A necessary condition for forming the quarter-wave plate 104 of the above type is that the thin films of the double-refraction materials have thicknesses D that meet the equations $dn1 \cdot D = \{j+(\frac{1}{4})\} \cdot L1$ and $dn2 \cdot D = \{k+(\frac{1}{4})\} \cdot L2$ where j and k are integers.

Figure 3:
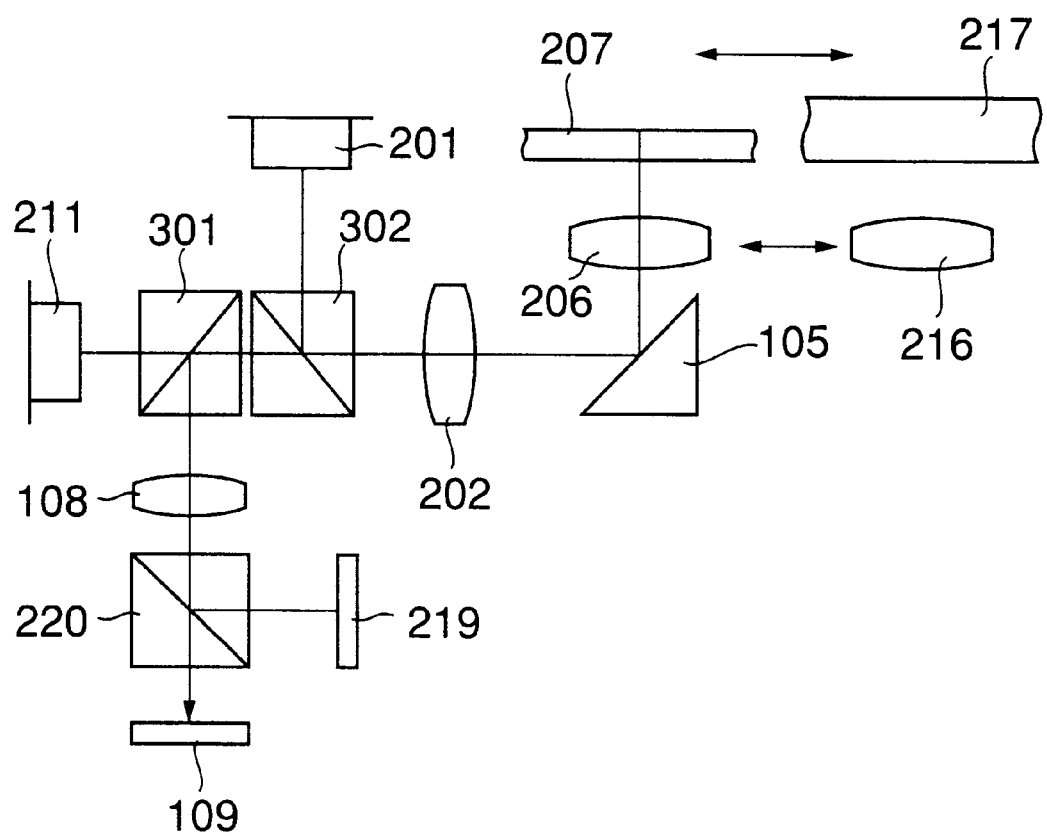
FIG. 3 is a diagram showing a further embodiment of the optical pickup device of the present invention.

FIG. 3 shows a further embodiment of the optical pickup device of the present invention.

In FIG. 3, the elements which are essentially the same as corresponding elements in FIG. 1 are designated by the same reference numerals, and a description thereof will be omitted.

The optical pickup device of FIG. 3 is configured such that it further includes beam collectors 301 and 302 which collect the first and second light beams of the first and second light sources 201 and 211 to a common optical path to the single coupling lens 202. The optical pickup device of FIG. 3 is configured such that the coupling lens device includes a single coupling lens 202 only, the coupling lens provided for the first light source 201 and the second light source 211 in a shared manner, and the beam separator device includes a beam separator 220, the beam separator 220 provided for the first light source 201 and the second light source 211 in a shared manner.

In the optical pickup device of FIG. 3, when recording, reproducing or erasing information of the first optical disk 207, the first light source 201 is turned ON to emit the first laser beam having the first wavelength. A beam separator 302 reflects the first laser beam to the coupling lens 202. The coupling lens 202 converts the first laser beam into a collimated beam, the first coupling lens 202 providing the collimated beam with a circularly corrected profile in cross section. The corrected profile of the first laser beam is substantially circular in the cross section. The deflection prism 105 directs the collimated beam to the objective lens 206 by a 90-degree deflection. The beam from the objective lens 206 passes through the transparent substrate of the first optical disk 207. The objective lens 206 provides a light spot on the recording layer of the first optical disk 207 by focusing the collimated beam from the coupling lens 202.

A reflection beam of the light spot from the first optical disk 207 passes through the objective lens 206. The deflection prism 105 directs the reflection beam from the first optical disk 207 to the coupling lens 202 by a 90-degree deflection. The reflection beam from the deflection prism 105 is passed through the coupling lens 202 and the beam separator 302 and directed to the beam separator 301. The beam separator 301 directs the reflection beam from the deflection prism 105 to the cylindrical lens 108. The reflection beam directed from the beam separator 301 to the cylindrical lens 108 is passed through a beam separator 220. The cylindrical lens 108 focuses the lateral reflection beam from the beam separator 301 onto the photodetector 109.

The photodetector 109 receives the reflection beam from the beam separator 301, and outputs a signal indicative of an intensity of the received reflection beam to the control unit 110 (not shown in FIG. 3). The control unit 110 outputs a focusing error signal and a tracking error signal based on the output signal of the photodetector 109, so that a focusing control and a tracking control are carried out.

In the optical pickup device of FIG. 3, when recording, reproducing or erasing information of the second optical disk 217, the objective lens 216 is set in the active condition, instead of the objective lens 206, and the coupling lens 202 remains in the active condition. In the present embodiment, the objective lens actuator of the type, disclosed in the above-mentioned publication, may be used for changing one of the objective lenses 206 and 216 to the other.

The second light source 211 is turned ON to emit the second laser beam having the second wavelength. The second laser beam is passed through the beam separators 301 and 302 and directed to the coupling lens 202. The coupling lens 202 converts the second laser beam of the second light source 211 into a collimated beam. The coupling lens 202 provides the collimated beam with a circularly corrected profile in cross section. The corrected profile of the second laser beam is substantially circular in the cross section.

In the optical pickup device of FIG. 3, the deflection prism 105 directs the collimated beam from the coupling lens 202 to the objective lens 216 by a 90-degree deflection. The beam from the objective lens 216 passes through the transparent substrate of the second optical disk 217. The objective lens 216 provides a light spot on the recording layer of the second optical disk 217 by focusing the collimated beam from the coupling lens 202.

A reflection beam of the light spot from the second optical disk 217 passes through the objective lens 216. The deflection prism 105 directs the reflection beam from the second optical disk 217 to the coupling lens 202. The reflection beam from the deflection prism 105 is passed through the coupling lens 202 and the beam separator 302, and directed to the beam separator 301. The beam separator 301 directs the reflection beam from the deflection prism 105 to the cylindrical lens 108. The reflection beam directed from the beam separator 301 to the cylindrical lens 108 is directed to the photodetector 219 by the beam separator 220. The cylindrical lens 108 focuses the lateral reflection beam from the beam separator 301 onto the photodetector 219.

The photodetector 219 receives the reflection beam from the beam separator 220, and outputs a signal indicative of an intensity of the received reflection beam to the control unit 110 (not shown in FIG. 3). The control unit 110 outputs a focusing error signal and a tracking error signal based on the output signal of the photodetector 109, so that a focusing control and a tracking control are carried out.

In the optical pickup device of FIG. 3, the coupling lens device includes the single coupling lens 202 only, the coupling lens 202 provided for the first light source 201 and the second light source 211 in a shared manner, and the beam separator device includes the beam separator 220, the beam separator 220 provided for the first light source 201 and the second light source 211 in a shared manner. The beam separator 220 in this embodiment may be formed by a dichroic filter which acts to pass through the first laser beam having the first wavelength, and acts to reflect the second laser beam having the second wavelength. The beam separator 220 of such a dichroic filter is effective in increasing the quantity of the laser beams entering the photodetectors 109 and 219.

Figure 4A:
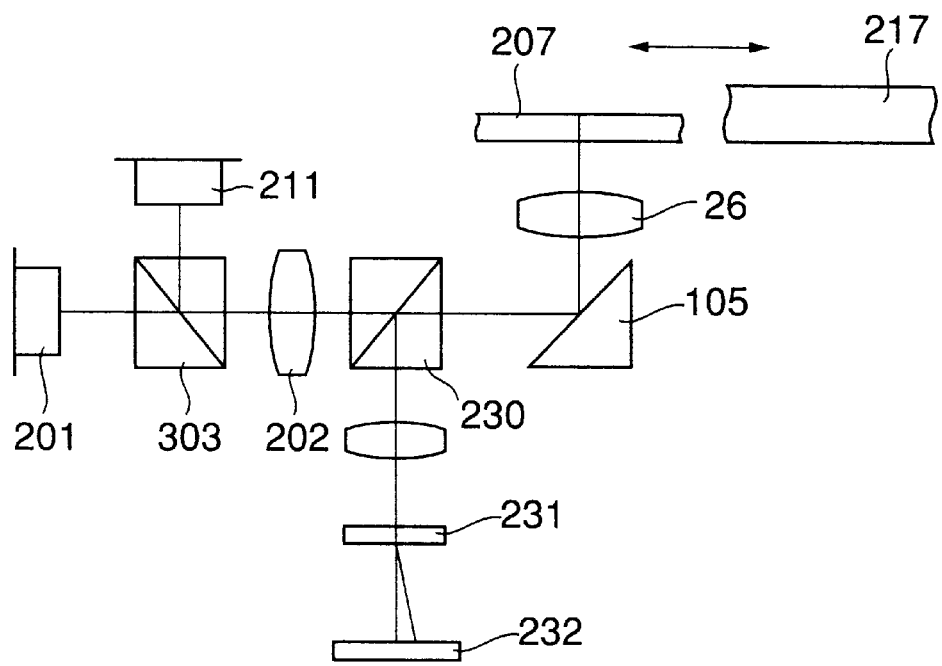
FIG. 4A and FIG. 4B are diagrams showing another embodiment of the optical pickup device of the present invention.
Figure 4B:
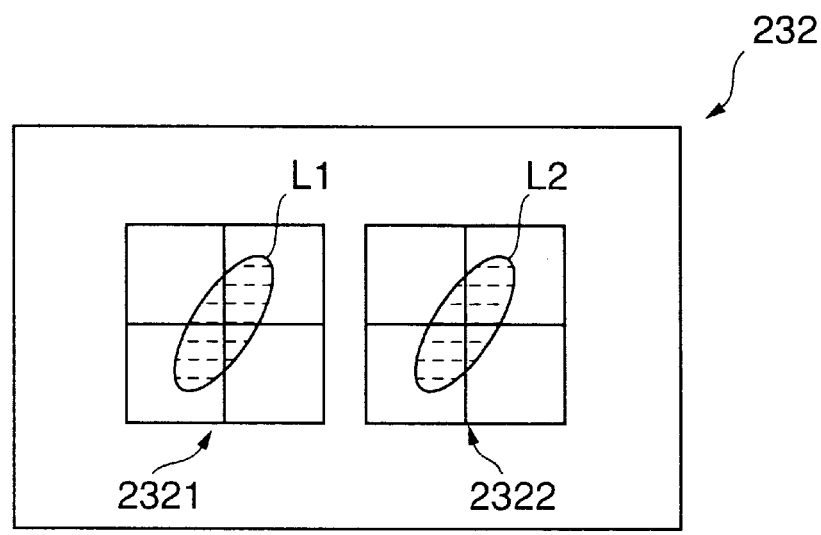

FIG. 4A and FIG. 4B show another embodiment of the optical pickup device of the present invention.

In FIG. 4A, the elements which are essentially the same as corresponding elements in FIG. 1 are designated by the same reference numerals, and a description thereof will be omitted.

The optical pickup device of FIG. 4A is configured such that it includes a beam collector 303 which collects the first and second light beams of the first and second light sources 201 and 211 to a common optical path to the single coupling lens 202. The optical pickup device of FIG. 4A is configured such that the coupling lens device includes a single coupling lens 202 only, the coupling lens 202 provided for the first light source 201 and the second light source 211 in a shared manner, and the beam separator device includes a beam separator 230, the beam separator 230 provided for the first light source 201 and the second light source 211 in a shared manner, and the photodetector device includes a hologram element 231 and a photodetector 232. Further, the optical pickup device of FIG. 4A is configured such that the objective lens device includes a single objective lens 26, the objective lens 26 provided for the first light source 201 and the second light source 211 in a shared manner. The objective lens 26 in this embodiment is used with a first numerical aperture (NA=0.6) when the first optical disk 207 (the DVD) is accessed, and used with a second numerical aperture (NA=0.5) when the second optical disk 217 (the CD) is accessed.

In the optical pickup device of FIG. 4A, when recording, reproducing or erasing information of the first optical disk 207, the first light source 201 is turned ON to emit the first laser beam having the first wavelength. The beam collector 303 passes through the first laser beam to the coupling lens 202. The coupling lens 202 converts the first laser beam into a collimated beam, the first coupling lens 202 providing the collimated beam with a circularly corrected profile in cross section. The beam separator 230 passes through the collimated beam. The deflection prism 105 directs the collimated beam to the objective lens 26 by a 90-degree deflection. The beam from the objective lens 26 passes through the transparent substrate of the first optical disk 207. The objective lens 26 provides a light spot on the recording layer of the first optical disk 207 by focusing the collimated beam from the coupling lens 202.

A reflection beam of the light spot from the first optical disk 207 passes through the objective lens 26. The deflection prism 105 directs the reflection beam from the first optical disk 207 to the beam separator 230 by a 90-degree deflection. The beam separator 230 directs the reflection beam from the deflection prism 105 to the hologram element 231. The hologram element 231 provides a focusing function and a diffracting function for the lateral reflection beam from the beam separator 230. The hologram element 231 directs the lateral reflection beam to a proper position of the photodetector 232 by the diffraction, and focuses the lateral reflection beam onto the photodetector 232.

The photodetector 232 receives the reflection beam from the beam separator 230, and outputs a signal indicative of an intensity of the received reflection beam to the control unit 110 (not shown in FIG. 4A). The control unit 110 outputs a focusing error signal and a tracking error signal based on the output signal of the photodetector 232, so that a focusing control and a tracking control are carried out.

In the optical pickup device of FIG. 4A, when recording, reproducing or erasing information of the second optical disk 217, the objective lens 26 and the coupling lens 202 remain in the active condition. The second light source 211 is turned ON to emit the second laser beam having the second wavelength. The beam collector 303 reflects the second laser beam to the optical path directed to the coupling lens 202. The coupling lens 202 converts the second laser beam of the second light source 211 into a collimated beam. The coupling lens 202 provides the collimated beam with a circularly corrected profile in cross section. The corrected profile of the second laser beam is substantially circular in the cross section. The beam separator 230 passes through the collimated beam.

In the optical pickup device of FIG. 4A, the deflection prism 105 directs the collimated beam from the coupling lens 202 to the objective lens 26 by a 90-degree deflection. The beam from the objective lens 26 passes through the transparent substrate of the second optical disk 217. The objective lens 26 provides a light spot on the recording layer of the second optical disk 217 by focusing the collimated beam from the coupling lens 202.

A reflection beam of the light spot from the second optical disk 217 passes through the objective lens 26. The deflection prism 105 directs the reflection beam from the second optical disk 217 to the beam separator 230 by a 90-degree deflection. The beam separator 230 directs the reflection beam from the deflection prism 105 to the hologram element 231. The hologram element 231 provides a focusing function and a diffracting function for the lateral reflection beam from the beam separator 230. The hologram element 231 directs the lateral reflection beam to a proper position of the photodetector 232 by the diffraction, and focuses the lateral reflection beam onto the photodetector 232.

The photodetector 232 receives the reflection beam from the beam separator 230, and outputs a signal indicative of an intensity of the received reflection beam to the control unit 110 (not shown in FIG. 4A). The control unit 110 outputs a focusing error signal and a tracking error signal based on the output signal of the photodetector 232, so that a focusing control and a tracking control are carried out.

FIG. 4B shows a configuration of the photodetector 232 in the optical pickup device of FIG. 4A. As shown in FIG. 4B, the photodetector 232 includes a 4-division photodetecting element 2321 and a 4-division photodetecting element 2322 which are arranged side by side. The hologram element 231 provides a different diffraction angle for the lateral reflection beam from the beam separator 230, according to the wavelength of the laser beam entering the hologram element 231. When the first laser beam having the first wavelength is emitted by the first light source 201, the hologram element 231 directs the lateral reflection beam to the 4-division photodetecting element 2321 of the photodetector 232 by the diffraction. When the second laser beam having the second wavelength is emitted by the second light source 211, the hologram element 231 directs the lateral reflection beam to the 4-division photodetecting element 2322 of the photodetector 232 by the diffraction. In FIG. 4B, "L1" denotes a cross-sectional profile of the lateral reflection beam entering the 4-division photodetecting element 2321, and "L2" indicates a cross-sectional profile of the lateral reflection beam entering the 4-division photodetecting element 2322.

In the optical pickup device of FIG. 4A, the coupling lens device includes the single coupling lens 202 only, and the coupling lens 202 is provided for the first light source 201 and the second light source 211 in a shared manner. The beam collector 303 is provided for the first light source 201 and the second light source 211 in a shared manner. The beam collector 303 in this embodiment may be formed by a dichroic filter which acts to pass through the first laser beam having the first wavelength, and acts to reflect the second laser beam having the second wavelength. The beam collector 303 of such a dichroic filter is effective in increasing the quantity of the laser beams entering the photodetector 232.

In the optical pickup device of FIG. 4A, the single objective lens 26 is provided for the first light source 201 and the second light source 211 in a shared manner. The objective lens 26 in this embodiment is used with a first numerical aperture (NA=0.6) when the first optical disk 207 (the DVD) is accessed, and used with a second numerical aperture (NA=0.5) when the second optical disk 217 (the CD) is accessed. In order to attain this function, a known aperture stop, as disclosed in Japanese Laid-Open Patent Application No.9-54977, may be used with the objective lens 26 in the present embodiment.

Figure 5A:
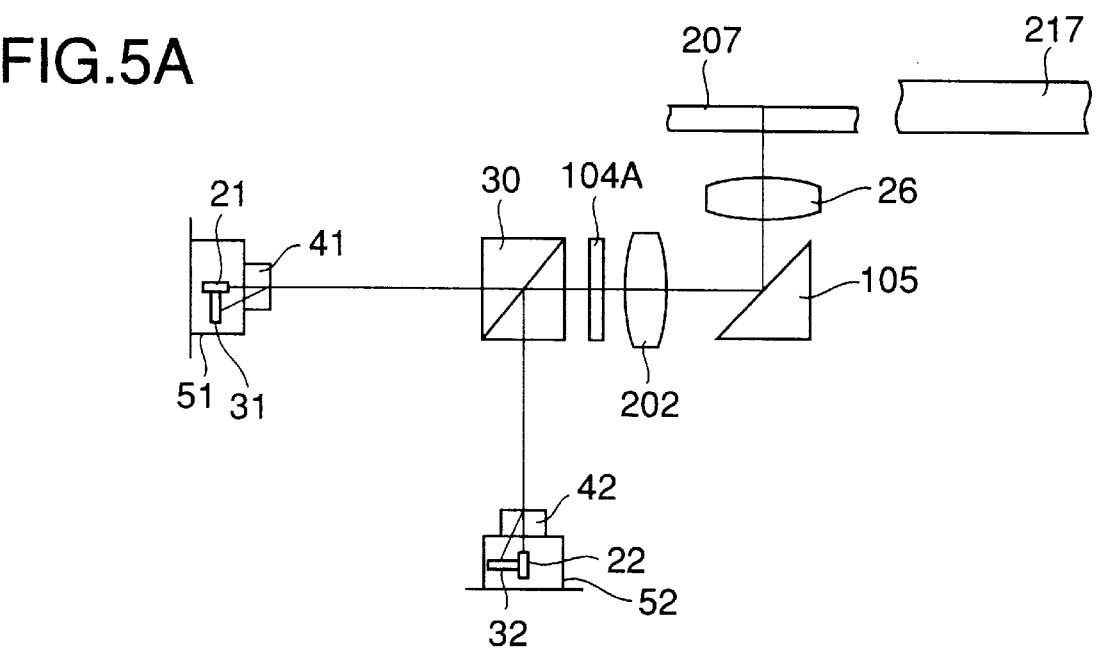
FIG. 5A, FIG. 5B and FIG. 5C are diagrams showing a further embodiment of the optical pickup device of the present invention.
Figure 5B:
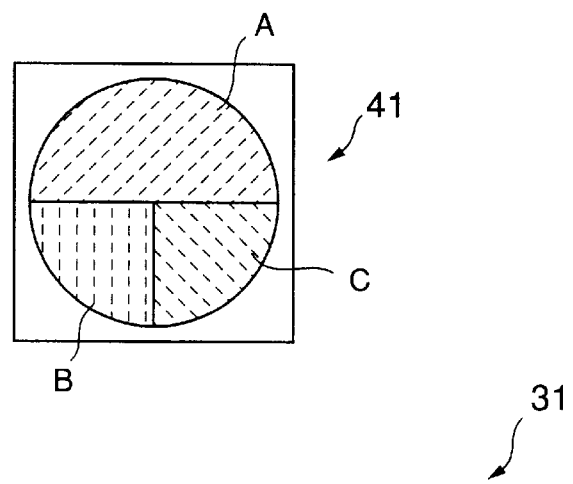
Figure 5C:
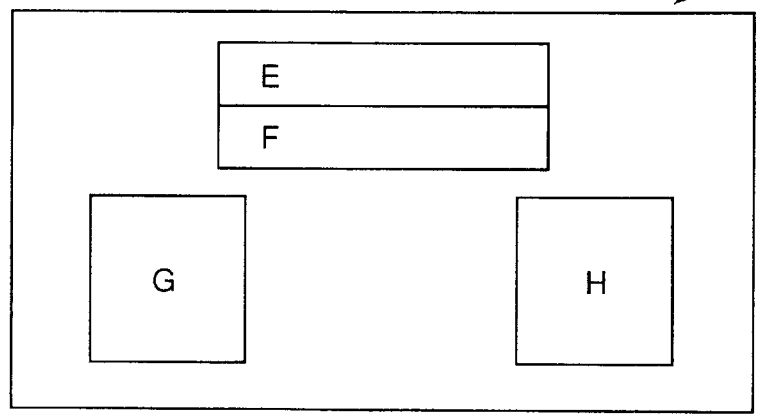

FIG. 5A, FIG. 5B and FIG. 5C show a further embodiment of the optical pickup device of the present invention.

In FIG. 5A, the elements which are essentially the same as corresponding elements in FIG. 1 are designated by the same reference numerals, and a description thereof will be omitted.

The optical pickup device of FIG. 5A is configured such that a first light source 21, a photodetector device 31 and a hologram element 41 are incorporated into a unified module 51, and a second light source 22, a photodetector device 32 and a hologram element 42 are incorporated into a unified module 52.

In the optical pickup device of FIG. 5A, when recording, reproducing or erasing information of the first optical disk 207, the first light source 21 is turned ON to emit the first laser beam having the first wavelength. The hologram element 41 passes through the first laser beam, and the first laser beam is directed to a beam splitter 30. The beam splitter 30 and the quarter-wave plate 104A pass through the first laser beam. The coupling lens 202 converts the first laser beam into a collimated beam, the first coupling lens 202 providing the collimated beam with a circularly corrected profile in cross section. The deflection prism 105 directs the collimated beam to the objective lens 26 by a 90-degree deflection. The beam from the objective lens 26 passes through the transparent substrate of the first optical disk 207. The objective lens 26 provides a light spot on the recording layer of the first optical disk 207 by focusing the collimated beam from the coupling lens 202.

A reflection beam of the light spot from the first optical disk 207 passes through the objective lens 26. The deflection prism 105 directs the reflection beam from the first optical disk 207 to the coupling lens 202 by a 90-degree deflection. The coupling lens 202 passes through the reflection beam. The quarter-wave plate 104A converts the reflection beam from the deflection prism 105 into a phase-shifted polarized beam. The polarized beam from the quarter-wave plate 104A is directed to the beam splitter 30. The beam splitter 30 passes through the polarized beam. The hologram element 41 provides a focusing function and a diffracting function for the polarized beam from the quarter-wave plate 104A. The hologram element 41 directs the polarized beam to a proper position of the photodetector device 31 by the diffraction, and focuses the polarized beam onto the photodetector device 31.

In the optical pickup device of FIG. 5A, when recording, reproducing or erasing information of the second optical disk 217, the second light source 22 is turned ON to emit the second laser beam having the second wavelength. The hologram element 42 passes through the second laser beam. The beam spitter 30 reflects the second laser beam to the optical path directed to the coupling lens 202. The quarter-wave plate 104A passes through the second laser beam. The coupling lens 202 converts the second laser beam of the second light source 22 into a collimated beam. The coupling lens 202 provides the collimated beam with a circularly corrected profile in cross section. The corrected profile of the second laser beam is substantially circular in the cross section. The deflection prism 105 directs the collimated beam from the coupling lens 202 to the objective lens 26 by a 90-degree deflection. The beam from the objective lens 26 passes through the transparent substrate of the second optical disk 217. The objective lens 26 provides a light spot on the recording layer of the second optical disk 217 by focusing the collimated beam from the coupling lens 202.

A reflection beam of the light spot from the second optical disk 217 passes through the objective lens 26. The deflection prism 105 directs the reflection beam from the second optical disk 217 to the coupling lens 202 by a 90-degree deflection. The coupling lens 202 passes through the reflection beam. The quarter-wave plate 104A converts the reflection beam from the deflection prism 105 into a phase-shifted polarized beam. The polarized beam from the quarter-wave plate 104A is directed to the hologram element 42 by the beam splitter 30. The hologram element 42 provides a focusing function and a diffracting function for the polarized beam from the quarter-wave plate 104A. The hologram element 42 directs the polarized beam to a proper position of the photodetector device 32 by the diffraction, and focuses the polarized beam onto the photodetector device 32.

FIG. 5B shows a configuration of the hologram element 41 in the optical pickup device of FIG. 5A. In the present embodiment, each of the hologram elements 41 and 42 is formed by a polarization hologram element which is known in the prior art. For example, a known polarization hologram element utilizing $LiNbO_3$ may be used. As shown in FIG. 5B, the hologram element 41 is divided into three hologram areas A, B and C. The hologram element 41 is formed by a polarization hologram element. The hologram element 41 acts to pass through the first laser beam emitted by the first light source 21. The hologram element 41 acts to provide a focusing function and a diffracting function for the polarized beam from the quarter-wave plate 104A.

FIG. 5C shows a configuration of the photodetector device 31 in the optical pickup device of FIG. 5A. As shown in FIG. 5C, the photodetector device 31 is divided into three parts, including 2-division photodetecting elements E and F, and a pair of photodetecting elements G and H separated from the 2-division photodetecting elements E and F. The hologram element 41 provides a different diffraction angle for the polarized beam from the quarter-wave plate 104A according to the wavelength of the laser beam entering the hologram element 41. When the first laser beam having the first wavelength is emitted by the first light source 21, the hologram element 41 diffracts the polarized beam to the three positions of the photodetector device 31.

In the optical pickup device of FIG. 5A, the hologram element 42 and the photodetector device 32 are essentially the same as the hologram element 41 and the photodetector device 31, and a duplicate description will be omitted. The beam splitter 30 in the present embodiment is essentially the same as the element 220 in the embodiment of FIG. 3, and a duplicate description will be omitted.

In the optical pickup device of FIG. 5A, a control unit (not shown) which is similar to the control unit 110 of FIG. 1 is provided. In this control unit, a focusing error signal is generated based on a difference between the output signals of the 2-division photodetecting elements E and F of the photodetector device 31 in accordance with a known knife-edge method. In the control unit, a tracking error signal is generated based on a difference between the output signals of the photodetecting elements G and H of the photodetector device 31. In the control unit, a reproduced signal is generated based on a sum of the output signals of the photodetecting elements E, F, G and H of the photodetector device 31. The objective lens 26 is provided with an actuator (not shown), and the actuator is driven in accordance with the focusing error signal and the tracking error signal output by the control unit, so as to move the objective lens 26 in the focusing direction and the tracking direction. The diffraction angle for the polarized beam from the quarter-wave plate 104A by the hologram element 31 depends on the wavelength of the laser beam entering the hologram element 31. The size and the position of each of the photodetecting elements E, F, G and H in the photodetector device 31 are arranged as shown in FIG. 5C by taking account of the relationship between the diffraction angles of the hologram element 41 and the wavelengths of the first and second laser beams.

In the optical pickup device of FIG. 5A, the first light source 21, the photodetector device 31 and the hologram element 41 are incorporated into the unified module 51, and the second light source 22, the photodetector device 32 and the hologram element 42 are incorporated into the unified module 52. It is possible for the optical pickup device of the present embodiment to provide the flexibility of the layout of an optical pickup device which has a simple structure and is inexpensive.

Figure 6:
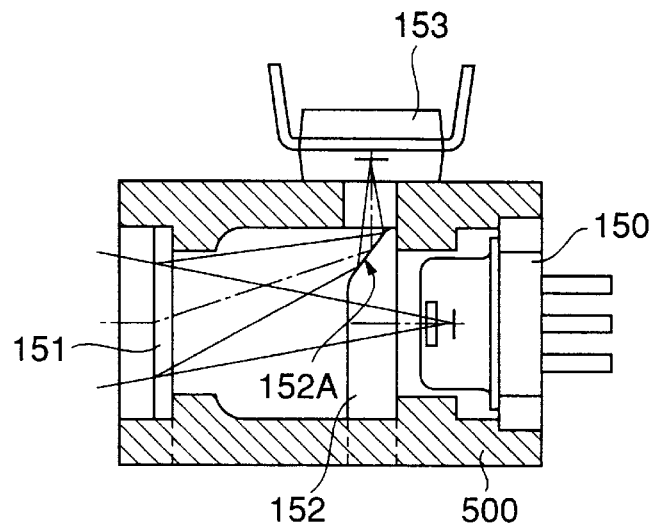
FIG. 6 is a diagram of a unified module incorporating a light source, a hologram element and a photodetecting element.

FIG. 6 shows a unified module 500 which incorporates a light source, a hologram element and a photodetecting element. This unified module 500 may be provided in any of the above-described embodiments of the optical pickup device.

As shown in FIG. 6, in the unified module 500, a light source 150, a hologram element 151, a transparent plate 152 and a photodetecting element 153 provided. The light source 150 may be one of the first and second light sources 201 and 211. The hologram element 151 may be the polarization hologram element 41 shown in FIG. 5B. The photodetecting element 153 may be the photodetecting element 31 shown in FIG. 5C.

In the unified module 500 of FIG. 6, the laser beam emitted by the light source 150 is passed through the transparent plate 152 and the hologram element 151 to the optical disk (not shown). A reflection beam of a light spot from the optical disk is directed to the hologram element 151. The hologram element 151 directs the reflection beam to a proper position of the photodetecting element 153 by the diffraction, and focuses the reflection beam onto the photodetecting element 153. The transparent plate 152 includes a slanted reflection surface 152A. The diffracted beams from the hologram element 151 are reflected to the photodetecting element 153 by the slanted reflection surface 152A.

Figure 7A:
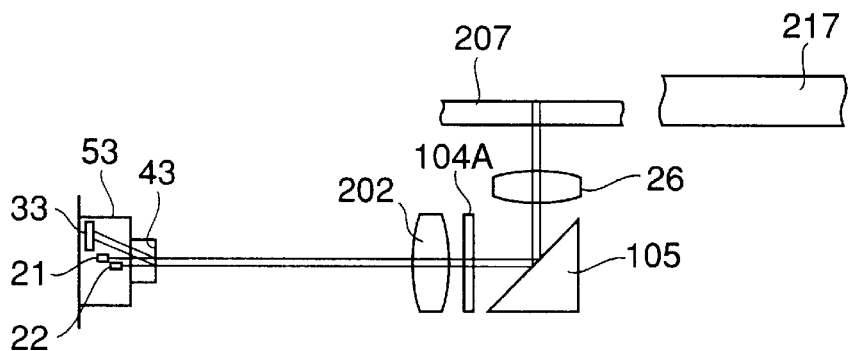
FIG. 7A and FIG. 7B are diagrams showing another embodiment of the optical pickup device of the present invention.
Figure 7B:
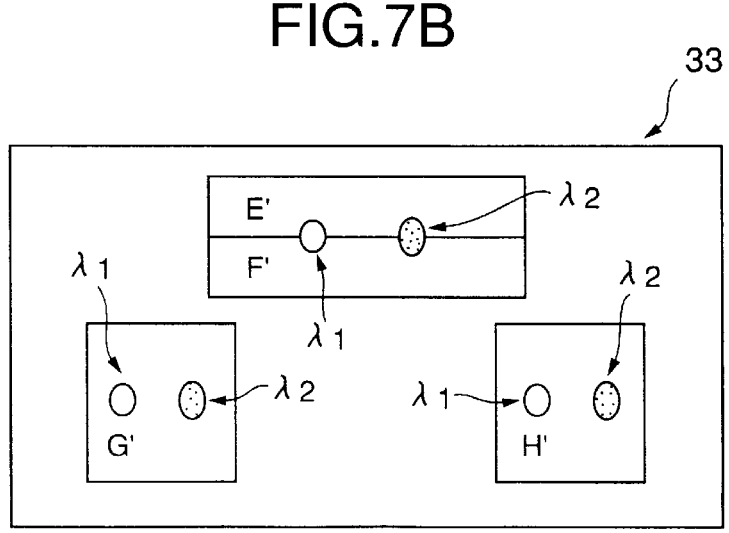

FIG. 7A and FIG. 7B show another embodiment of the optical pickup device of the present invention.

In FIG. 7A, the elements which are essentially the same as corresponding elements in FIG. 1 are designated by the same reference numerals, and a description thereof will be omitted.

The optical pickup device of FIG. 7A is configured such that the first and second light sources 21 and 22, a photodetector device 33, and a hologram element 43 are incorporated into a unified module 53.

In the optical pickup device of FIG. 7A, when recording, reproducing or erasing information of the first optical disk 207, the first light source 21 is turned ON to emit the first laser beam having the first wavelength. The hologram element 43 passes through the first laser beam to the coupling lens 202. The coupling lens 202 converts the first laser beam into a collimated beam, the first coupling lens 202 providing the collimated beam with a circularly corrected profile in cross section. The quarter-wave plate 104A passes through the collimated beam. The deflection prism 105 directs the collimated beam to the objective lens 26 by a 90-degree deflection. The beam from the objective lens 26 passes through the transparent substrate of the first optical disk 207. The objective lens 26 provides a light spot on the recording layer of the first optical disk 207 by focusing the collimated beam from the coupling lens 202.

A reflection beam of the light spot from the first optical disk 207 passes through the objective lens 26. The deflection prism 105 directs the reflection beam from the first optical disk 207 to the quarter-wave plate 104A by a 90-degree deflection. The quarter-wave plate 104A converts the reflection beam from the deflection prism 105 into a phase-shifted polarized beam. The coupling lens 202 passes through the polarized beam. The polarized beam from the quarter-wave plate 104A is directed to the hologram element 43. The hologram element 231 provides a focusing function and a diffracting function for the polarized beam from the quarter-wave plate 104A. The hologram element 43 directs the polarized beam to a proper position of the photodetector device 33 by the diffraction, and focuses the polarized beam onto the photodetector device 33.

In the optical pickup device of FIG. 7A, when recording, reproducing or erasing information of the second optical disk 217, the second light source 22 is turned ON to emit the second laser beam having the second wavelength. The hologram element 43 passes through the second laser beam. The coupling lens 202 converts the second laser beam of the second light source 22 into a collimated beam. The coupling lens 202 provides the collimated beam with a circularly corrected profile in cross section. The corrected profile of the second laser beam is substantially circular in the cross section. The quarter-wave plate 104A passes through the collimated beam. The deflection prism 105 directs the collimated beam from the coupling lens 202 to the objective lens 26 by a 90-degree deflection. The beam from the objective lens 26 passes through the transparent substrate of the second optical disk 217. The objective lens 26 provides a light spot on the recording layer of the second optical disk 217 by focusing the collimated beam from the coupling lens 202.

A reflection beam of the light spot from the second optical disk 217 passes through the objective lens 26. The deflection prism 105 directs the reflection beam from the second optical disk 217 to the quarter-wave plate 104A by a 90-degree deflection. The quarter-wave plate 104A converts the reflection beam from the deflection prism 105 into a phase-shifted polarized beam. The coupling lens 202 passes through the polarized beam. The polarized beam from the quarter-wave plate 104A is directed to the hologram element 43. The hologram element 231 provides a focusing function and a diffracting function for the polarized beam from the quarter-wave plate 104A. The hologram element 43 directs the polarized beam to a proper position of the photodetector device 33 by the diffraction, and focuses the polarized beam onto the photodetector device 33.

FIG. 7B shows a configuration of the photodetector device 33 in the optical pickup device of FIG. 7A. As shown in FIG. 7B, the photodetector device 33 is divided into three parts, including 2-division photodetecting elements E' and F', and a pair of photodetecting elements G' and H' separated from the 2-division photodetecting elements E' and F'. The hologram element 33 provides a different diffraction angle for the polarized beam from the quarter-wave plate 104A according to the wavelength of the laser beam entering the hologram element 33. When the first laser beam having the first wavelength is emitted by the first light source 21, the hologram element 33 diffracts the polarized beam to the three positions of the photodetector device 33 as indicated by the hollow circles in FIG. 7B. When the second laser beam having the second wavelength is emitted by the second light source 22, the hologram element 33 diffracts the polarized beam to the three positions of the photodetector device 33 as indicated by the gray circles in FIG. 7B.

In the optical pickup device of FIG. 7A, a control unit (not shown) which is similar to the control unit 110 of FIG. 1 is provided. In this control unit, a focusing error signal is generated based on a difference between the output signals of the 2-division photodetecting elements E' and F' of the photodetector device 33 in accordance with the knife-edge method. In the control unit, a tracking error signal is generated based on a difference between the output signals of the photodetecting elements G' and H' of the photodetector device 33. In the control unit, a reproduced signal is generated based on a sum of the output signals of the photodetecting elements E', F', G' and H' of the photodetector device 33. The objective lens 26 is provided with an actuator (not shown), and the actuator is driven in accordance with the focusing error signal and the tracking error signal output by the control unit, so as to move the objective lens 26 in the focusing direction and the tracking direction. The diffraction angle for the polarized beam from the quarter-wave plate 104A by the hologram element 33 depends on the wavelength of the laser beam entering the hologram element 33. The size and the position of each of the photodetecting elements E', F', G' and H' in the photodetector device 33 are arranged as shown in FIG. 7B by taking account of the relationship between the diffraction angles of the hologram element 33 and the wavelengths of the first and second laser beams.

In the optical pickup device of FIG. 7A, the first and second light sources 21 and 22, the photodetector device 33, and the hologram element 43 are incorporated into the unified module 53. It is possible for the optical pickup device of the present embodiment to provide the flexibility of the layout of an optical pickup device which has a simple structure and is inexpensive.

Next, a description will be given of some examples of the coupling lens and the objective lens in the optical pickup device embodying the present invention.

In the following examples, the coupling lens 202 is made of a single glass material. The coupling lens 202 has a first aspherical surface on an optical-disk side, and a second aspherical surface on a light-source side. The first optical disk 207 has a substrate which is about 0.6 mm thick, and the second optical disk 217 has a substrate which is about 1.2 mm thick. The wavelength of the first laser beam emitted by the first light source 201 or 21 is equal to 635 nm, and the wavelength of the second laser beam emitted by the second light source 211 or 22 is equal to 785 nm.

EXAMPLE 1

The coupling lens 202 of this example has the following specifications:

The coupling lens 202 is made of a glass material. The refractive index of the glass material: $n_{635}=1.726879$ (for the first laser wavelength=635 nm), $n_{785}=1.718770$ (for the second laser wavelength=785 nm). The thickness of the coupling lens across its optical axis: 5.9144 mm.

The coupling lens has a first surface on the optical disk side and a second surface on the light source side. These surfaces are aspherical surfaces which are defined by the following equation:

$$Z=((1/Rx)X^2+(1/Ry)Y^2)/[1+\sqrt{1-(1+Kx)(1/Rx)^2X^2-(1+Ky)(1/Ry)^2Y^2}]+Ar[(1-Ap)X^2+(1+Ap)Y^2]^2+$$

$$Br[(1-Bp)X^2+(1+Bp)Y^2]^3+Cr[(1-Cp)X^2+(1+Cp)Y^2]^4+Dr[(1-Dp)X^2+(1+Dp)Y^2]^5]$$

where Z denotes a coordinate of a point on the relevant lens surface along the optical axis of the coupling lens, Rx and Ry are the radii of paraxial curvature of the relevant lens surface within the XZ plane and within the YZ plane, Kx and Ky are the conical coefficients, Ar, Br, Cr and Dr are the rotational symmetry components of the 4th, 6th, 8th and 10th cone modification coefficients of the relevant lens surface, and Ap, Bp, Cp and Dp are the non-rotational-symmetry components of the 4th, 6th, 8th and 10th cone modification coefficients of the relevant lens surface.

The first surface of the coupling lens 202 on the optical disk side is defined by the above equation
(1) with the values of the coefficients:
Rx=31.37083, Ry=6.44850, Kx=−0.655035,
Ky=0.160280, Ar=−0.509955E−5, Br=−0.119283E−5,
Cr=0.466601E−6, Dr=−0.360245E−7,
Ap=−0.439089E+1, Bp=0.841915E+0,
Cp=0.458520E+0, Dp=0.436494E−0.

The second surface of the coupling lens 202 on the light source side is defined by the above equation
(1) with the values of the coefficients:
Rx=−24.94260, Ry=5.62131, Kx=0.839450,
Ky=1.860382, Ar=−0.179779E−6, Br=0.480492E−7,
Cr=−0.250100E−9, Dr=0.144679E−6,
Ap=0.309997E+2, Bp=−0.174237E+1,
Cp=0.560766E+1, Dp=0.160343E−0.

In the above values of the coefficients, for example, "E−6" means that the preceding value is multiplied by $10^{-6}$. Hereinafter, the same notation will be used.

Figure 8A:
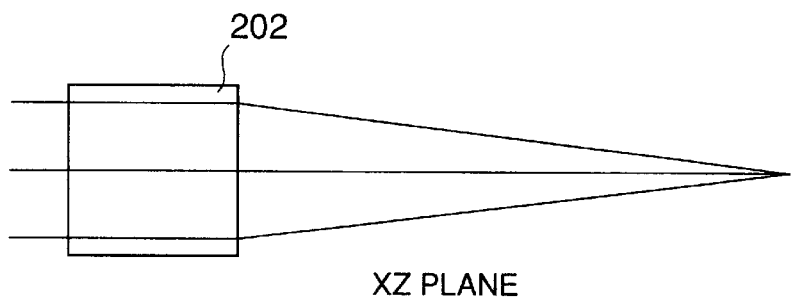
FIG. 8A and FIG. 8B are diagrams for explaining an operation of an example of a coupling lens.
Figure 8B:
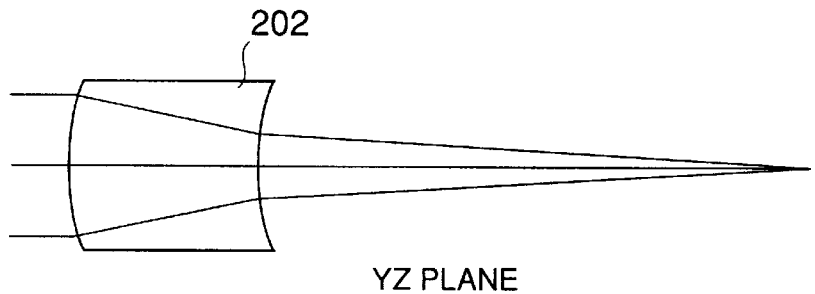

FIG. 8A and FIG. 8B are diagrams for explaining an operation of the coupling lens 202 in this example. FIG. 8A shows the configuration of the coupling lens 202 within the XZ plane, and FIG. 8B shows the configuration of the coupling lens 202 within the YZ plane. It is assumed that a direction of the laser light along the optical axis from the left to the right in FIG. 8A and FIG. 8B corresponds to a positive direction of the Z axis of the coupling lens 202.

The coupling lens 202 of this example has the following focal distances: fx (within the XZ plane) =25 mm, fy (within the YZ plane)=30 mm. The coupling lens of this example has the following wave aberrations for the 4-mm entrance pupil.

| FIELD ANGLE(°) | WAVE ABERRATIONS (wavelength 635 nm) | | WAVE ABERRATIONS (wavelength 785 nm) | |
|---|---|---|---|---|
| | X-DIRECTION | Y-DIRECTION | X-DIRECTION | Y-DIRECTION |
| 0.0 | 0.004 | 0.004 | 0.002 | 0.002 |
| 0.5 | 0.013 | 0.002 | 0.009 | 0.002 |
| 1.0 | 0.024 | 0.009 | 0.018 | 0.009 |

The objective lens 206 of this example, which is used with the first light source 201, has the following specifications:

The objective lens 206 is made of a glass material. The refractive index of the glass material: $n_{635}=1.726592$ (for the first laser wavelength=635 nm). The thickness of the objective lens across its optical axis: 1.5 mm.

The objective lens 206 has a first surface on the light source side and a second surface on the optical disk side. The first and second surfaces are aspherical surfaces which are defined by the following equation:

$$Z=(Y^2/R)/[1+\sqrt{1-(1+K)(Y/R)^2}]+A(4)Y^4+A(6)Y^6+A(8)Y^8+A(10)Y^{10}+A(12)Y^{12}+A(14)Y^{14}+\ldots] \quad (2)$$

where Z denotes a coordinate of a point on the relevant lens surface along the optical axis, Y denotes a coordinate of a point on the relevant lens surface in the Y direction perpendicular to the optical axis, R is the radius of paraxial curvature of the relevant lens surface, K is the conical coefficient, and A(4), A(6), A(8), A(10), A(12), A(14) are the high-order asymmetrical coefficients.

The first surface of the objective lens 206 on the light source side is defined by the above equation (2) with the values of the coefficients:
R=2.04808, K=−1.035674, A(4)=0.800204E−2,
A(6)=0.545642E−4, A(8)=0.312394E−3,
A(10)=−0.242959E−3, A(12)=0.868334E−4,
A(14)=−0.121603E−4

The second surface of the objective lens 206 on the optical disk side is defined by the above equation (2) with the values of the coefficients:
R=124.76465, K=−10310.38073, A(4)=0.283742E−2,
A(6)=−0.164780E−2, A(8)=0.724141E−3,
A(10)=−0.162198E−3, A(12)=0.0, A(14)=0.0

The second objective lens 216 of this example, which is combined with the second laser diode 211, has the following specifications:

The second objective lens 216 is made of a glass material. The refractive index of the glass material: $n_{785}=1.718770$ (for the second laser wavelength=785 nm). The thickness of the second objective lens across its optical axis: 1.5 mm.

The second objective lens 216 has a first surface on the light source side and a second surface on the optical disk side. The first and second surfaces are aspherical surfaces which are defined by the above equation (2).

The first surface of the second objective lens 216 on the light source side is defined by the above equation (2) with the values of the coefficients:
R=2.01457, K=0.103221, A(4)=−0.906922E−2,
A(6)=−0.428885E−2, A(8)=0.124844E−2,
A(10)=−0.553283E−3

The second surface of the second objective lens 216 on the optical disk side is defined by the above equation (2) with the values of the coefficients:

R=−9.55565, K=−235.507118, A(4)=−0.219996E−1,

A(6)=0.190672E−1, A(8)=−0.891788E−2,

A(10)=0.164671E−2

In the above-mentioned example, the coupling lens 202 and the objective lens 206 are combined, and a light spot on the recording surface of the first optical disk 207 (the substrate thickness 0.6 mm) is formed with the numerical aperture NA=0.6 by the laser beam emitted by the first laser diode 201 (the wavelength 635 nm). The wave aberration on the optical axis in this condition is 0.001. This shows that this example is adequate to produce a light spot at the diffraction limit on the optical disk. Further, in the above-mentioned example, the coupling lens 202 and the second objective lens 216 are combined, and a light spot on the recording surface of the second optical disk 217 (the substrate thickness 1.2 mm) is formed with the numerical aperture NA=0.5 by the laser beam emitted by the second laser diode 211 (the wavelength 785 nm). The wave aberration on the optical axis in this condition is 0.001. This shows that this example is adequate to produce a light spot at the diffraction limit on the optical disk.

EXAMPLE 2

The coupling lens 202 of this example has the following specifications:

The coupling lens 202 is made of a glass material. The refractive index of the glass material: $n_{635}$=1.726879 (for the first laser wavelength=635 nm), $n_{785}$=1.718770 (for the second laser wavelength=785 nm). The thickness of the coupling lens 202 across its optical axis: 8.33682 mm.

The coupling lens 202 has a first surface on the optical disk side and a second surface on the light source side. These surfaces are aspherical surfaces which are defined by the above equation (1).

The first surface of the coupling lens 202 on the optical disk side is defined by the above equation (1) with the values of the coefficients:

Rx=62.86178, Ry=5.78511, Kx=−72.446826,

Ky=0.171136, Ar=−0.323481E−6, Br=0.571124E−9,

Cr=−0.256975E−6, Dr=−0.166469E−11,

Ap=−0.279816E+2, Bp=−0.255397E+2,

Cp=−0.141214E+1, Dp=0.514634E−1.

The second surface of the coupling lens 202 on the light source side is defined by the above equation (1) with the values of the coefficients:

Rx=−10.02826, Ry=3.09780, Kx=3.771989,

Ky=0.678061, Ar=0.445838E−6, Br=−0.295592E−7,

Cr=−0.109379E−9, Dr=0.151651E−7,

Ap=0.361759E+2, Bp=0.111074E+2,

Cp=−0.179133E+2, Dp=−0.117326E−1.

The coupling lens 202 of this example has the following focal distances: fx (within the XZ plane)=12.5 mm, fy (within the YZ plane)=30 mm. The coupling lens of this example has the following wave aberrations for the 4-mm entrance pupil.

| FIELD ANGLE(°) | WAVE ABERRATIONS (wavelength 635 nm) | | WAVE ABERRATIONS (wavelength 785 nm) | |
|---|---|---|---|---|
| | X-DIRECTION | Y-DIRECTION | X-DIRECTION | Y-DIRECTION |
| 0.0 | 0.007 | 0.007 | 0.004 | 0.004 |
| 0.5 | 0.013 | 0.005 | 0.009 | 0.004 |
| 1.0 | 0.025 | 0.015 | 0.017 | 0.013 |

In this example, the first objective lens 206 and the second objective lens 216 which are the same as those of the above example 1 are used.

In this example, the above-mentioned coupling lens 202 and the objective lens 206 are combined, and a light spot on the recording surface of the first optical disk 207 (the substrate thickness 0.6 mm) is formed with the numerical aperture NA=0.6 by the laser beam emitted by the first laser diode 201 (the wavelength 635 nm). The wave aberration on the optical axis in this condition is 0.003. This shows that this example is adequate to produce a light spot at the diffraction limit on the optical disk. Further, in the above-mentioned example, the coupling lens 202 and the second objective lens 216 are combined, and a light spot on the recording surface of the second optical disk 217 (the substrate thickness 1.2 mm) is formed with the numerical aperture NA=0.5 by the laser beam emitted by the second laser diode 211 (the wavelength 785 nm). The wave aberration on the optical axis in this condition is 0.003. This shows that this example is adequate to produce a light spot at the diffraction limit on the optical disk.

Figure 9A:
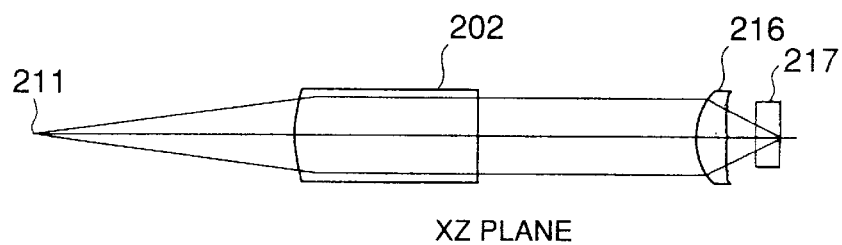
FIG. 9A, FIG. 9B, FIG. 9C and FIG. 9D are diagrams for explaining an operation of another example of a coupling lens and objective lenses.
Figure 9B:
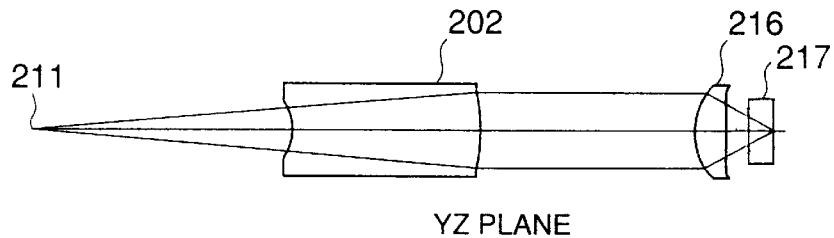
Figure 9C:
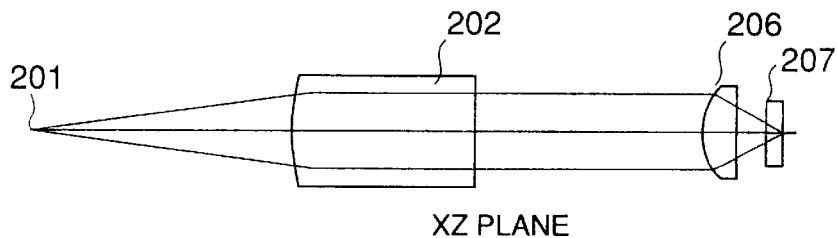
Figure 9D:
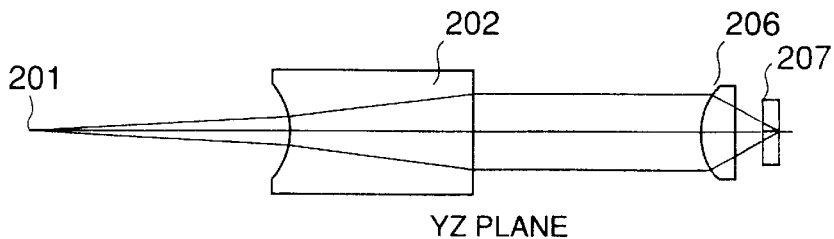

FIG. 9A, FIG. 9B, FIG. 9C and FIG. 9D are diagrams for explaining an operation of the coupling lens 202 and the objective lenses 206 and 216 in this example. FIG. 9A and FIG. 9B show the configurations of the coupling lens 202 and the second objective lens 216 within the XZ plane and within the YZ plane, and FIG. 9C and FIG. 9D show the configurations of the coupling lens 202 and the objective lens 206 within the XZ plane and within the YZ plane.

In the previous embodiments of FIG. 4A, FIG. 5A and FIG. 7A, the single objective lens 26 is provided for the first light source and the second light source in a shared manner, and the coupling lens 202 is provided to convert one of the first and second light beams into a collimated beam, the coupling lens 202 circularly correcting a cross-sectional profile of each of the first and second light beams. In these embodiments, the objective lens is usually configured to optimize the characteristics for accessing the first optical disk (or the DVD) having the substrate with the smaller thickness. When the second optical disk (or the CD) is accessed by using the coupling lens and the thus configured objective lens, the second laser beam entering the objective lens is divergent, and there is a problem in that the wave aberration of the objective lens when it is shifted in a radial direction of the second optical disk due to the tracking control, is likely to be degraded. In such a case, the accessing characteristics of the optical pickup device for the second optical disk will be lowered.

Next, a description will be given of a further embodiment of the optical pickup device of the present invention in which the above-mentioned problem is eliminated. FIG. 10A and FIG. 10B show an operation of the optical pickup device of this embodiment.

In FIG. 10A and FIG. 10B, reference numeral 7 denotes a first optical disk (for example, the DVD), reference numeral 8 indicates a second optical disk (for example, the CD), reference numeral 1 denotes a first light source (for example, a laser diode), and reference numeral 2 indicates a second light source (for example, a laser diode). The first optical disk 7 has a transparent substrate which is about 0.6 mm thick. The second optical disk 8 has a transparent substrate which is about 1.2 mm thick. The first light source 1 emits a first laser beam having a first wavelength (for example, 650 nm). The second light source 2 emits a second laser beam having a second wavelength (for example, 785 nm). The optical pickup device of the present embodiment is configured such that a single coupling lens 3 and a single objective lens 6 are provided for the first optical disk 7 and the second optical disk 8 in a shared manner.

In the optical pickup device of FIG. 10A and FIG. 10B, the objective lens 6 is configured to optimize the characteristics for accessing the first optical disk 7, and the coupling lens 3 is provided to convert at least the first light beam of the first and second light beams into a collimated beam, the coupling lens 3 circularly correcting a cross-sectional profile of each of the first and second light beams. The objective lens 6 is provided for the first light source 1 and the second light source 2 in a shared manner. The objective lens 6 is used with a first numerical aperture when the first optical disk 7 is accessed, and used with a second numerical aperture when the second optical disk 8 is accessed.

As shown in FIG. 10A, when the first optical disk 7 is accessed, the coupling lens 3 converts the first laser beam into a collimated beam, and the coupling lens 3 circularly corrects a cross-sectional profile of the first laser beam. The collimated beam is directed to the objective lens 6. The objective lens 6 is used with the first numerical aperture. The objective lens 6 provides a light spot on a recording layer of the first optical disk 7 by focusing the beam with the profile circularly corrected by the coupling lens 3.

In the optical pickup device of the present embodiment, the coupling lens 3 is anamorphic and has a longitudinal magnification and a lateral magnification which are different from each other, and the coupling lens 3 provides a cross-sectional profile correction function for each of the first and second light beams.

As shown in FIG. 10B, when the second optical disk 8 is accessed, the coupling lens 3 converts the second light beam into a nearly collimated beam, and the coupling lens 3 circularly corrects a cross-sectional profile of the second light beam. The corrected profile of the second light beam is substantially circular in the cross section. The objective lens 6 is used with the second numerical aperture. Even when the laser beam entering the objective lens 6 is divergent, the objective lens 6 provides a light spot on a recording layer of the second optical disk 8 by focusing the beam with the profile circularly corrected by the coupling lens 3. According to the present embodiment, the degradation of the wave aberration of the objective lens 6, when it is shifted in a radial direction of the second optical disk 8 due to the tracking control, can be prevented. It is possible to provide good characteristics for reproducing, recording or erasing of information of the first optical disk 7 and the second optical disk 8 in a shared manner.

Figure 11:
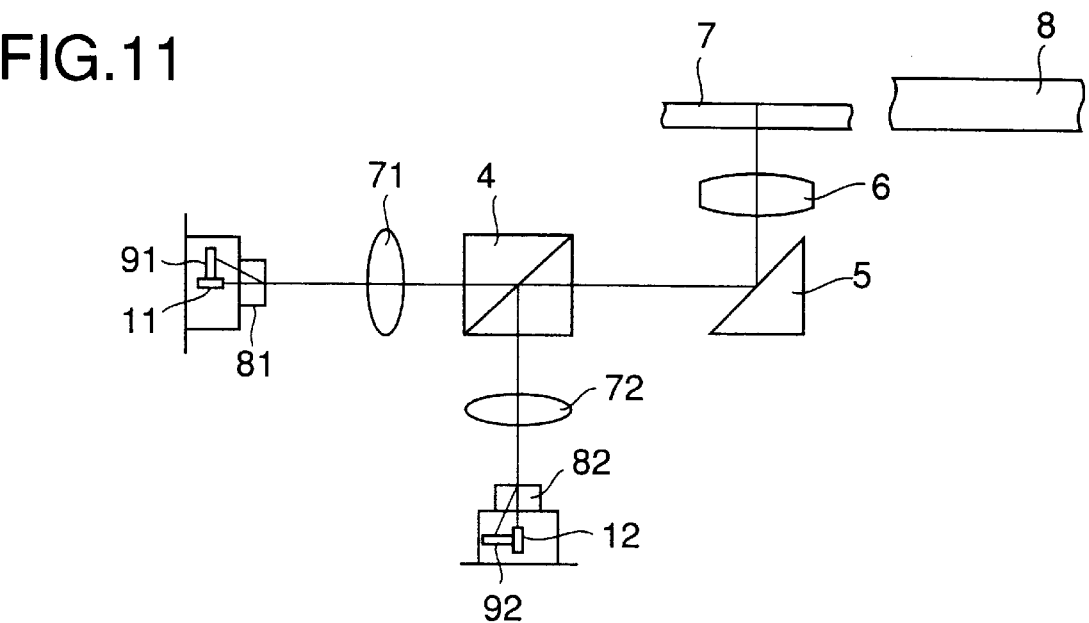
FIG. 11 is a diagram showing another embodiment of the optical pickup device of the present invention.

FIG. 11 shows another embodiment of the optical pickup device of the present invention.

In FIG. 11, the elements which are essentially the same as corresponding elements in FIG. 10A and FIG. 10B are designated by the same reference numerals, and a description thereof will omitted. In FIG. 11, reference numeral 11 denotes the first light source which emits the first laser beam having the first wavelength (650 nm), and reference numeral 12 denotes the second light source which emits the second laser beam having the second wavelength (785 nm).

As shown in FIG. 11, the optical pickup device of the present embodiment is configured such that the first light source 11, a beam separator device 81 and a photodetector device 91 are incorporated into a unified module, and the second light source 12, a beam separator device 82 and a photodetector device 92 are incorporated into another unified module. Further, in the optical pickup device of FIG. 11, a first coupling lens 71, a second coupling lens 72, a beam splitter 4 and a deflection prism 5 are provided. The first coupling lens 71 is provided for the first light source 11, and the second coupling lens 72 is provided for the second light source 12. The beam splitter 4 acts to direct each of the first laser beam emitted by the first light source 11 and the second laser beam emitted by the second light source 12 to an optical path to the deflection prism 5. The deflection prism 5 directs the beam from the beam splitter 4 to the objective lens 6 by a 90-degree deflection. The objective lens 6 is essentially the same as that of the embodiment of FIG. 10A and FIG. 10B.

In the present embodiment, each of the beam separator device 81 and the beam separator device 82 are formed by using a polarization hologram element. Alternatively, the beam separator devices 81 and 82 may be formed by using a normal hologram element.

Figure 12:
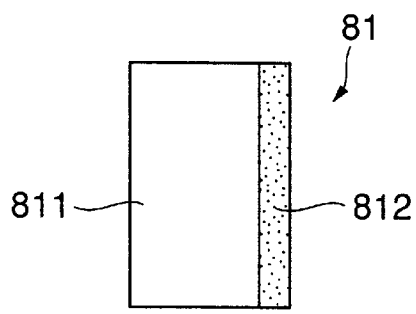
FIG. 12 is a diagram for explaining a configuration of a beam separator device in the optical pickup device of FIG. 11.

FIG. 12 shows a configuration of the beam separator device 81 in the optical pickup device of FIG. 11. As shown in FIG. 12, the beam separator device 81 is constituted by a polarization hologram element 811 and a quarter-wave plate 812 which are formed integrally. The polarization hologram element 811 includes a lattice-structure hologram. For example, a known polarization hologram element utilizing $LiNbO_3$ may be used.

Figure 13:
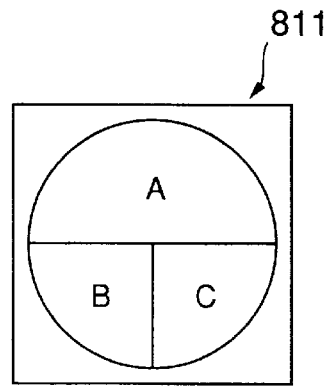
FIG. 13 is a diagram for explaining a configuration of a hologram element in the optical pickup device of FIG. 11.

FIG. 13 shows a configuration of the polarization hologram element 811 in the optical pickup device of FIG. 11. As shown in FIG. 13, the polarization hologram element 811 is divided into three hologram areas A, B and C. The hologram element 811 acts to pass through the first laser beam emitted by the first light source 11. The hologram element 811 acts to provide a focusing function and a diffracting function for the polarized beam from the quarter-wave plate 812.

Figure 14:
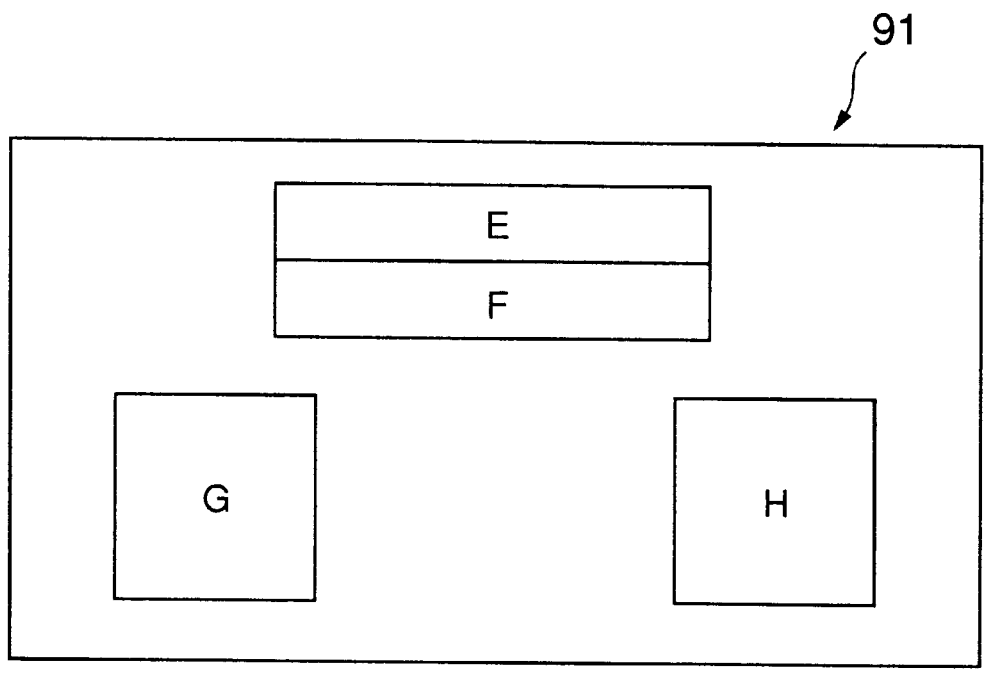
FIG. 14 is a diagram for explaining a configuration of a photodetector device in the optical pickup device of FIG. 11.

FIG. 14 shows a configuration of the photodetector device 91 in the optical pickup device of FIG. 11. As shown in FIG. 14, the photodetector device 91 is divided into three parts, including 2-division photodetecting elements E and F, and a pair of photodetecting elements G and H separated from the 2-division photodetecting elements E and F. As described above, the hologram element 811 provides a different diffraction angle for the polarized beam from the quarter-wave plate 812 according to the wavelength of the laser beam entering the hologram element 811. When the first laser beam having the first wavelength is emitted by the first light source 11, the hologram element 811 diffracts the polarized beam to the three positions of the photodetector device 91.

In the optical pickup device of FIG. 11, the beam separator device 82 and the photodetector device 92 are essentially the same as the beam separator device 81 and the photodetector device 91 except that the former is provided for the second light source 12. A duplicate description will be omitted. The beam splitter 4 in the present embodiment is essentially the same as the element 220 in the embodiment of FIG. 3, and a duplicate description will be omitted.

Further, in the optical pickup device of FIG. 11, a control unit (not shown) which is essentially the same as the control unit 110 of FIG. 1 is provided. In the control unit, a focusing error signal is generated based on a difference between the output signals of the 2-division photodetecting elements E and F of the photodetector device 91 (or 92) in accordance with a known knife-edge method. In the control unit, a tracking error signal is generated based on a difference between the output signals of the photodetecting elements G and H of the photodetector device 91 (or 92). In the control unit, a reproduced signal is generated based on a sum of the output signals of the photodetecting elements E, F, G and H of the photodetector device 91 (or 92). The objective lens 6 is provided with an actuator (not shown), and the actuator is driven in accordance with the focusing error signal and the tracking error signal output by the control unit, so as to move the objective lens 6 in the focusing direction and the tracking direction. The diffraction angle for the polarized beam from the quarter-wave plate 812 by the hologram element 811 depends on the wavelength of the laser beam entering the hologram element 811. The size and the position of each of the photodetecting elements E, F, G and H in the photodetector device 91 (or 92) are arranged as shown in FIG. 14 by taking account of the relationship between the diffraction angles of the hologram element 811 and the wavelengths of the first and second laser beams.

In the optical pickup device of FIG. 11, when recording, reproducing or erasing information of the first optical disk 7, the first light source 11 is turned ON to emit the first laser beam having the first wavelength. The beam separator device 81 passes through the first laser beam, and the first laser beam is directed to the first coupling lens 71. The coupling lens 71 converts the first laser beam into a collimated beam, and the coupling lens 71 circularly corrects a cross-sectional profile of the first laser beam. The corrected profile of the first laser beam is substantially circular in the cross section. The beam splitter 4 passes through the collimated beam. The deflection prism 5 directs the collimated beam to the objective lens 6 by a 90-degree deflection. The beam from the objective lens 6 passes through the transparent substrate of the first optical disk 7. The objective lens 6 is used with the first numerical aperture. The objective lens 6 provides a light spot on the recording layer of the first optical disk 7 by focusing the beam with the profile circularly corrected by the coupling lens 71.

A reflection beam of the light spot from the first optical disk 7 passes through the objective lens 6. The deflection prism 5 directs the reflection beam from the first optical disk 7 to the beam splitter 4 by a 90-degree deflection. The beam splitter 4 and the coupling lens 71 pass through the reflection beam. The reflection beam is directed to the beam separator device 81. The quarter-wave plate 812 of the beam separator device 81 converts the reflection beam from the deflection prism 5 into a phase-shifted polarized beam. The polarized beam from the quarter-wave plate 812 is directed to the hologram element 811. The hologram element 811 provides a focusing function and a diffracting function for the polarized beam from the quarter-wave plate 812. The hologram element 811 directs the polarized beam to a proper position of the photodetector device 91 by the diffraction, and focuses the polarized beam onto the photodetector device 91.

In the optical pickup device of FIG. 11, when recording, reproducing or erasing information of the second optical disk 8, the second light source 12 is turned ON to emit the second laser beam having the second wavelength. The beam separator device 82 passes through the second laser beam. The second laser beam is directed to the second coupling lens 72. The coupling lens 72 converts the second laser beam of the second light source 12 into a nearly collimated beam, or the coupling lens 72 attenuates the divergent characteristic of the second laser beam. The coupling lens 72 circularly corrects a cross-sectional profile of the second laser beam. The corrected profile of the second laser beam is substantially circular in the cross section. The beam splitter 4 acts to reflect the collimated beam from the coupling lens 72 to the optical path to the deflection prism 5. The deflection prism 5 directs the collimated beam from the beam splitter 4 to the objective lens 6 by a 90-degree deflection. The beam from the objective lens 26 passes through the transparent substrate of the second optical disk 8. The objective lens 6 is used with the second numerical aperture. The objective lens 6 provides a light spot on the recording layer of the second optical disk 8 by focusing the beam with the profile circularly corrected by the coupling lens 72.

A reflection beam of the light spot from the second optical disk 8 passes through the objective lens 6. The deflection prism 5 directs the reflection beam from the second optical disk 8 to the beam splitter 4 by a 90-degree deflection. The beam splitter 4 acts to reflect the reflection beam from the deflection prism 5 to the coupling lens 72. The coupling lens 72 passes through the reflection beam. The quarter-wave plate (not shown) of the beam separator device 82 converts the reflection beam from the beam splitter 4 into a phase-shifted polarized beam. The polarized beam from the quarter-wave plate is directed to the hologram element (not shown) of the beam separator device 82. The hologram element of the beam separator device 82 provides a focusing function and a diffracting function for the polarized beam from the quarter-wave plate. The hologram element directs the polarized beam to a proper position of the photodetector device 92 by the diffraction, and focuses the polarized beam onto the photodetector device 92.

In the optical pickup device of FIG. 11, the coupling lens 72, which is provided for the second light source 12, is configured so as to prevent the degradation of the wave aberration of the objective lens 6 when it is shifted in a radial direction of the second optical disk 8 due to the tracking control. The coupling lens 72 in the present embodiment provides a wave aberration which is substantially proportional to a field angle of the coupling lens 72. In the optical pickup device of FIG. 11, when the second optical disk 8 (which is one of the first and second optical disks 7 and 8 having the transparent substrate with the larger thickness) is accessed, the coupling lens 72 and the objective lens 6 in the present embodiment provide a magnification that is larger than 0.2. These features of the present embodiment will be described below in detail.

Next, a description will be given of some examples of the coupling lens and the objective lens in the optical pickup device embodying the present invention.

EXAMPLE 3

The coupling lens 3 of this example has the following specifications:

The coupling lens of this example has the following focal distances: fx (within the XZ plane)=15.75 mm, fy (within the YZ plane)=16.00 mm, the object distance=65 mm.

The coupling lens of this example has a first aspherical surface on the optical disk side and a second spherical surface on the light source side.

The first surface of the coupling lens on the optical disk side is defined by the above equation (1) with the values of the coefficients:

Rx=7.17335, Ry=7.25866, Kx=−4.690912,
Ky=8.7666645, Ar=−0.804117E−3, Br=−0.426340E−3,
Cr=0.846433E−3, Dr=−0.439150E−3,
Ap=0.465035, Bp=0.440182,
Cp=−0.528813, Dp=−0.507486.

The second surface of the coupling lens on the light source side is spherical, and can be defined by the above equation (1) with the values of the coefficients:

Rx=27.84533, Ry=27.84533.

The thickness of the coupling lens across the optical axis: 3.0 mm (or 4.0 mm). The coupling lens is made of a glass material. The refractive index of the glass material is: $n_{785}$=1.582 (for the second laser wavelength=785 nm).

The coupling lens of this example has the following wave aberrations with respect to the field angle of the coupling lens (for the 2-mm entrance pupil).

| FIELD | WAVE ABERRATIONS | |
|---|---|---|
| ANGLE(°) | X-DIRECTION | Y-DIRECTION |
| 0.00 | 0.011 | 0.011 |
| 0.33 | 0.011 | 0.011 |
| 0.67 | 0.011 | 0.012 |
| 1.00 | 0.012 | 0.012 |

The objective lens 6 of this example, which is used with the coupling lens 3 and configured so as to optimize the characteristics for accessing the first optical disk 7 (or the DVD), has the following specifications:

The objective lens 6 is made of a glass material. The refractive index of the glass material: $n_{650}$=1.580 (for the first laser wavelength=650 nm) and $n_{785}$=1.582 (for the second laser wavelength=785 nm). The thickness of the objective lens across the optical axis: 1.8 mm.

The objective lens of this example has a first aspherical surface on the light source side and a second aspherical surface on the optical disk side. The first and second aspherical surfaces are defined by the above equation (2).

The first surface of the objective lens on the light source side is defined by the above equation (2) with the values of the coefficients:

R=2.11872, K=−0.518289, A(4)=0.262089E−3,
A(6)=−0.115589E−3, A(8)=−0.228469E−4,
A(10)=−0.947513E−5.

The second surface of the objective lens on the optical disk side is defined by the above equation (2) with the values of the coefficients:

R=−15.34282, K=14.682633, A(4)=0.803950E−2,
A(6)=−0.219719E−2, A(8)=0.362251E−3,
A(10)=−0.257317E−4.

In the above-mentioned example, the coupling lens 3 and the objective lens 6 are combined, and a light spot on the recording surface of the second optical disk 8 (the substrate thickness 1.2 mm) is formed. The wave aberration on the optical axis in this condition is 0.02. This shows that this example is adequate to produce a light spot at the diffraction limit on the second optical disk. The magnification in the X-axis direction in this condition is 0.180, and the magnification in the Y-axis direction in this condition is 0.177. Even when the laser beam entering the objective lens is divergent, the coupling lens converts the second light beam into a collimated beam, the coupling lens circularly correcting a cross-sectional profile of the second light beam. It is possible to provide good characteristics for reproducing, recording or erasing of information of the first optical disk and the second optical disk in a shared manner.

EXAMPLE 4

The coupling lens 3 of this example has the following specifications:

The coupling lens of this example has the following focal distances: fx (within the XZ plane)=10.00 mm, fy (within the YZ plane)=16.00 mm, the object distance=65 mm.

The coupling lens of this example has a first aspherical surface on the optical disk side and a second aspherical surface on the light source side.

The first surface of the coupling lens on the optical disk side is defined by the above equation (1) with the values of the coefficients:

Rx=6.037330, Ry=3.420200, Kx=0.401414,
Ky=−0.029733, Ar=−0.190041E−3, Br=−0.732519E−5,
Cr=−0.985449E−6, Dr=0.470535E−7,
Ap=−0.506305, Bp=0.458993,
Cp=−1.606290, Dp=−1.774190.

The second surface of the coupling lens on the light source side is defined by the above equation (1) with the values of the coefficients:

Rx=−124.564190, Ry=3.077670, Kx=100.00000,
Ky=1.018174, Ar=0.269779E−2, Br=−0.236192E−5,
Cr=−0.231896E−4, Dr=0.156467E−3,
Ap=0.551269, Bp=−0.490446,
Cp=0.962925, Dp=0.520591.

The coupling lens of this example has the following wave aberrations with respect to the field angle of the coupling lens (for the 3-mm entrance pupil).

| FIELD | WAVE ABERRATIONS | |
|---|---|---|
| ANGLE(°) | X-DIRECTION | Y-DIRECTION |
| 0.00 | 0.004 | 0.003 |
| 0.33 | 0.009 | 0.006 |
| 0.67 | 0.017 | 0.011 |
| 1.00 | 0.026 | 0.017 |

The coupling lens of this example has the first and second aspherical surfaces as defined above. The wave aberrations of this example are preferably corrected with reference to the wave aberrations of the above example 3. The beam profile correction function (the difference between the focal distances fx and fy) of the coupling lens of this example is increased from that of the above example 3.

The coupling lens 3 of this example and the objective lens 6 of the above example 3 are combined, and a light spot on the recording surface of the second optical disk 8 (the substrate thickness 1.2 mm) is formed. The wave aberration on the optical axis in this condition is 0.03. This shows that this example is adequate to produce a light spot at the diffraction limit on the second optical disk. The magnification in the X-axis direction in this condition is 0.38, and the magnification in the Y-axis direction in this condition is 0.28. Even when the laser beam entering the objective lens is divergent, the coupling lens converts the second light beam into a collimated beam, the coupling lens circularly correcting a cross-sectional profile of the second light beam. It is possible to provide good characteristics for reproducing, recording or erasing of information of the first optical disk and the second optical disk in a shared manner.

EXAMPLE 5

The coupling lens 3 of this example has the following specifications:

The coupling lens of this example has the following focal distances: fx (within the XZ plane)=10.00 mm, fy (within the YZ plane)=14.00 mm, the object distance=−30 mm.

The coupling lens of this example has a first aspherical surface on the optical disk side and a second aspherical surface on the light source side.

The first surface of the coupling lens on the optical disk side is defined by the above equation (1) with the values of the coefficients:

Rx=4.6558, Ry=3.3235, Kx=0.1405,
Ky=−0.0367, Ar=0.2091318E−3, Br=−0.1376101E−5,
Cr=−0.5546373E−7, Dr=0.1053019E−18,
Ap=0.1915981, Bp=2.2966578,
Cp=−3.7095260, Dp=0.4783531E+3.

The second surface of the coupling lens on the light source side is defined by the above equation (1) with the values of the coefficients:

Rx=17.3860, Ry=3.6374, Kx=100.0000,
Ky=1.9197, Ar=0.7587680E−4, Br=−0.1818964E−4,
Cr=0.5141577E−3, Dr=−0.5598612E−4,
Ap=5.0833793, Bp=−0.1750090,
Cp=−0.3702244, Dp=−0.7386655.

The coupling lens of this example has the following wave aberrations with respect to the field angle of the coupling lens (for the 3-mm entrance pupil).

| FIELD | WAVE ABERRATIONS | |
| --- | --- | --- |
| ANGLE(°) | X-DIRECTION | Y-DIRECTION |
| 0.00 | 0.005 | 0.005 |
| 0.33 | 0.009 | 0.012 |
| 0.67 | 0.017 | 0.024 |
| 1.00 | 0.024 | 0.035 |

The objective lens 6 of this example, which is used with the coupling lens 3 and configured so as to optimize the characteristics for accessing the first optical disk 7 (or the DVD), has the following specifications:

The objective lens 6 is made of a glass material. The refractive index of the glass material: $n_{635}$=1.7269 (for the first laser wavelength=635 nm). The thickness of the objective lens across the optical axis: 1.5 mm.

The objective lens of this example has a first aspherical surface on the light source side and a second aspherical surface on the optical disk side. The first and second aspherical surfaces are defined by the above equation (2).

The first surface of the objective lens on the light source side is defined by the above equation (2) with the values of the coefficients:

R=2.053243, K=−1.037458, A(4)=0.7976399E−2,
A(6)=0.33803459E−4, A(8)=0.30324637E−3,
A(10)=−0.24483025E−3, A(12)=0.85833004E−4,
A(14)=−0.12160300E−4.

The second surface of the objective lens on the optical disk side is defined by the above equation (2) with the values of the coefficients:

R=160.405230, K=−13962.946, A(4)=0.27925309E−2,
A(6)=−0.17206880E−2, A(8)=0.68031910E−3,
A(10)=−0.14696463E−3.

In the above-mentioned example, the coupling lens 3 and the objective lens 6 are combined, and a light spot on the recording surface of the second optical disk 8 (the substrate thickness 1.2 mm) is formed. The wave aberration on the optical axis in this condition is 0.02. This shows that this example is adequate to produce a light spot at the diffraction limit on the second optical disk. The magnification in the X-axis direction in this condition is 0.28, and the magnification in the Y-axis direction in this condition is 0.24. Even when the laser beam entering the objective lens is divergent, the coupling lens converts the second light beam into a collimated beam, the coupling lens circularly correcting a cross-sectional profile of the second light beam. It is possible to provide good characteristics for reproducing, recording or erasing of information of the first optical disk and the second optical disk in a shared manner.

The present invention is not limited to the above-described embodiments, and variations and modifications may be made without departing from the scope of the present invention.

Further, the present invention is based on Japanese priority application No.10-124,932, filed on May 7, 1998, and Japanese priority application No.10-177,568, filed on Jun. 24, 1998, the entire contents of which are hereby incorporated by reference.

What is claimed is:

1. An optical pickup device for recording, reproducing or erasing information of a first optical disk and a second optical disk in a shared manner, the first and second optical disks having substrates different in thickness, comprising:

first and second light sources respectively emitting first and second light beams, the first and second light beams being different in wavelength, the different wavelengths being appropriate for the first and second optical disks;

a coupling lens device converting one of the first and second light beams into a collimated beam, the coupling lens device providing the collimated beam with a circularly corrected profile in cross section;

an objective lens device providing a light spot on one of the first and second optical disks by focusing the collimated beam from the coupling lens device;

a beam separator device separating a reflection beam of the light spot, passed through the objective lens device, from an optical path along which a corresponding one of the first and second light beams is directed to one of the first and second optical disks;

a photodetector device receiving the reflection beam from the beam separator device, and outputting a signal indicative of an intensity of the received reflection beam; and a control unit outputting a focusing error signal and a tracking error signal based on the signal output by the photodetector device, so that a focusing control and a tracking control are carried out, wherein the first light source is turned ON only when the first optical disk is accessed, and the second light source is turned ON only when the second optical disk is accessed, and wherein the coupling lens device is anamorphic and has a longitudinal magnification and a lateral magnification which are different from each other, the coupling lens device providing a collimation function and a cross-sectional profile correction function for each of the first and second light beams.

2. The optical pickup device of claim 1, wherein the coupling lens device includes first and second coupling lenses which are identical, the objective lens device includes first and second objective lenses, the beam separator device includes first and second beam separators, and the photodetector device includes first and second photodetectors, and wherein the first coupling lens, the first objective lens, the first beam separator and the first photodetector are combined together with respect to the first light beam so as to access the first optical disk, and the second coupling lens, the second objective lens, the second beam separator and the second photodetector are combined together with respect to the second light beam so as to access the second optical disk.

3. The optical pickup device of claim 1, wherein the coupling lens device includes a single coupling lens only, the single coupling lens provided for the first light source and the second light source in a shared manner.

4. The optical pickup device of claim 3, further comprising a beam collector collecting the first and second light beams of the first and second light sources to a common optical path to the single coupling lens.

5. The optical pickup device of claim 1, wherein the objective lens device includes a single objective lens, the objective lens provided for the first light source and the second light source in a shared manner, and the objective lens used with a first numerical aperture when the first optical disk is accessed, and used with a second numerical aperture when the second optical disk is accessed.

6. The optical pickup device of claim 1, wherein the coupling lens device includes a single coupling lens only, the coupling lens provided for the first light source and the second light source in a shared manner, and wherein the beam separator device includes a beam separator, the beam separator provided for the first light source and the second light source in a shared manner.

7. The optical pickup device of claim 6, wherein the first and second light sources, the photodetector device, and the beam separator are incorporated into a unified module.

8. The optical pickup device of claim 1, wherein one of the first and second light sources, the photodetector device, and the beam separator device are incorporated into a unified module.

9. The optical pickup device of claim 8, wherein the beam separator device includes a polarization hologram element.

10. The optical pickup device of claim 1, wherein the coupling lens device is made of a single glass material.

11. The optical pickup device of claim 1, wherein the coupling lens device has a first aspherical surface on an optical-disk side, and a second aspherical surface on a light-source side.

12. The optical pickup device of claim 1, wherein the first optical disk has a substrate which is about 0.6 mm thick, and the second optical disk has a substrate which is about 1.2 mm thick.

13. An optical pickup device for recording, reproducing or erasing information of a first optical disk and a second optical disk in a shared manner, the first and second optical disks having substrates different in thickness, comprising:

first and second light sources respectively emitting first and second light beams, the first and second light beams being different in wavelength, the different wavelengths being appropriate for the first and second optical disks;

a coupling lens converting at least one of the first and second light beams into a collimated beam, the coupling lens circularly correcting a cross-sectional profile of each of the first and second light beams;

an objective lens providing a light spot on one of the first and second optical disks by focusing the beam with the profile circularly corrected by the coupling lens;

a beam separator device separating a reflection beam of the light spot, passed through the objective lens, from an optical path along which a corresponding one of the first and second light beams is directed to said one of the first and second optical disks; and a photodetector device receiving the reflection beam from the beam separator device, and outputting a signal indicative of an intensity of the received reflection beam, wherein the coupling lens is anamorphic and has a longitudinal magnification and a lateral magnification which are different from each other, the coupling lens providing a cross-sectional profile correction function for each of the first and second light beams, and wherein the objective lens is provided for the first light source and the second light source in a shared manner, and the objective lens is used with a first numerical aperture when the first optical disk is accessed and used with a second numerical aperture when the second optical disk is accessed.

14. The optical pickup device of claim 13, wherein the beam separator device includes a first beam separator provided for the first light source and a second beam separator provided for the second light source, and the photodetector device includes a first photodetector provided for the first light source and a second photodetector provided for the second light source, and wherein the first light source, the first photodetector and the first beam separator are combined together into a first unified module with respect to the first light beam so as to access the first optical disk, and the second light source, the second photodetector and the second beam separator are combined together into a second unified module with respect to the second light beam so as to access the second optical disk.

15. The optical pickup device of claim 14, wherein the first beam separator separates, by using a polarization of the first light beam, a reflection beam of the light spot, passed through the objective lens, from the optical path of the first light beam directed to the first optical disk, and the second beam separator separates, by using a polarization of the second light beam, a reflection beam of the light spot, passed through the objective lens, from the optical path of the second light beam directed to the second optical disk.

16. The optical pickup device of claim 13, wherein the coupling lens has a first aspherical surface on an optical-disk side, and a second aspherical surface on a light-source side.

17. The optical pickup device of claim 13, wherein the coupling lens provides a wave aberration which is substantially proportional to a field angle of the coupling lens.

18. The optical pickup device of claim 13, wherein the first optical disk has a substrate which is about 0.6 mm thick, and the second optical disk has a substrate which is about 1.2 mm thick.

19. The optical pickup device of claim 13, wherein, when one of the first and second optical disks having a substrate with a larger thickness is accessed, the optical pickup device provides a magnification that is larger than 0.2.

* * * * *